R. C. LEAKE.
TIME RELEASE MECHANISM.
APPLICATION FILED AUG. 31, 1917.

1,384,533.

Patented July 12, 1921.
8 SHEETS—SHEET 1.

INVENTOR
Richard C. Leake,
BY
Neil O. Preston
ATTORNEY

R. C. LEAKE.
TIME RELEASE MECHANISM.
APPLICATION FILED AUG. 31, 1917.

1,384,533.

Patented July 12, 1921.
8 SHEETS—SHEET 2.

INVENTOR
Richard C. Leake,
BY
Neil D. Preston
ATTORNEY

R. C. LEAKE.
TIME RELEASE MECHANISM.
APPLICATION FILED AUG. 31, 1917.

1,384,533.

Patented July 12, 1921.
8 SHEETS—SHEET 3.

INVENTOR
Richard C. Leake,
BY
Neil D. Preston
ATTORNEY

R. C. LEAKE.
TIME RELEASE MECHANISM.
APPLICATION FILED AUG. 31, 1917.
1,384,533.
Patented July 12, 1921.
8 SHEETS—SHEET 4.
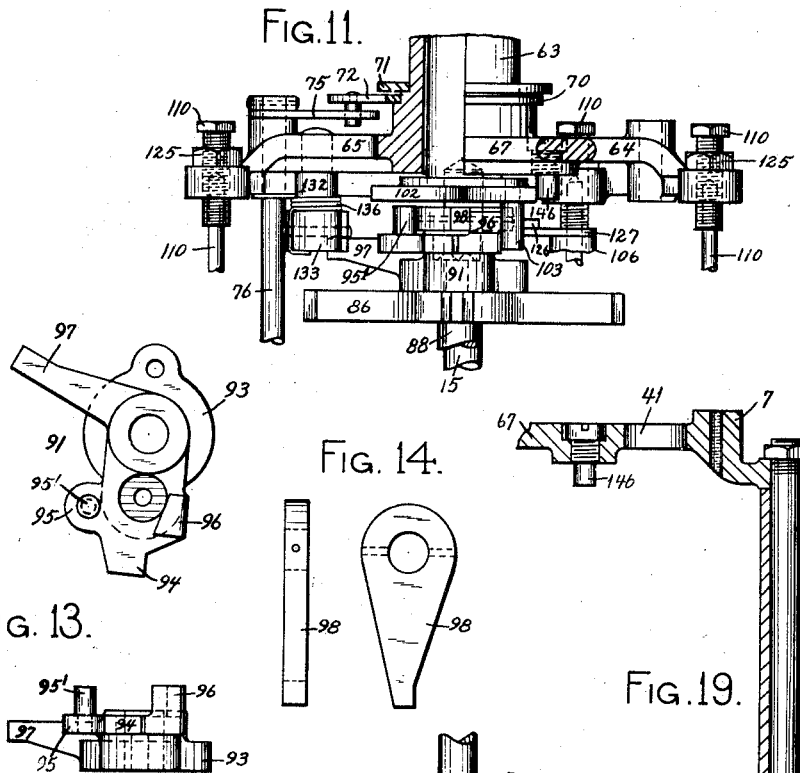
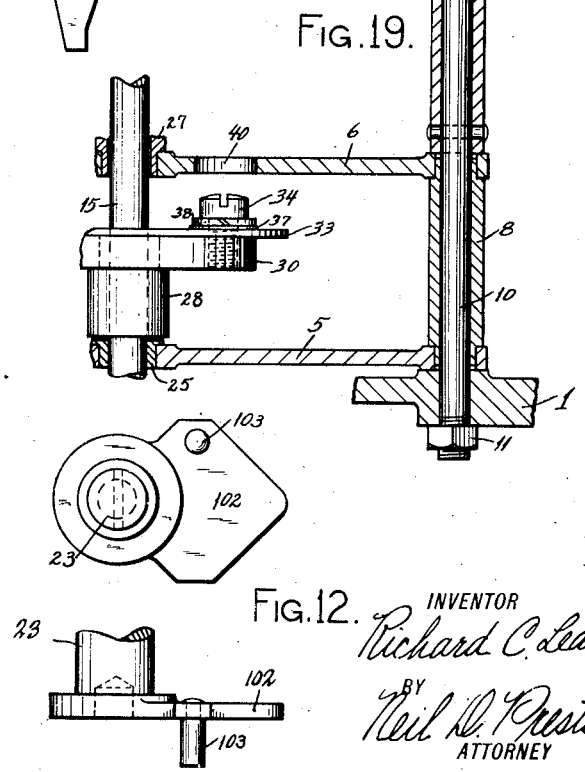
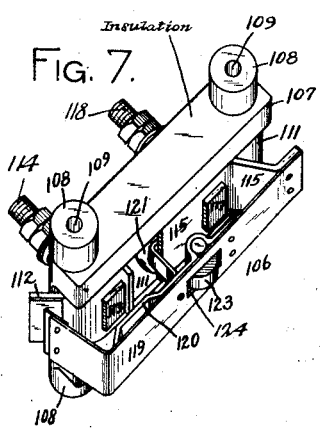
INVENTOR
Richard C. Leake,
BY
Neil D. Preston
ATTORNEY

R. C. LEAKE.
TIME RELEASE MECHANISM.
APPLICATION FILED AUG. 31, 1917.

1,384,533.

Patented July 12, 1921.
8 SHEETS—SHEET 5.

INVENTOR
Richard C. Leake,
BY
Neil D. Preston
ATTORNEY

R. C. LEAKE.
TIME RELEASE MECHANISM.
APPLICATION FILED AUG. 31, 1917.

1,384,533.

Patented July 12, 1921.
8 SHEETS—SHEET 7.

INVENTOR
Richard C. Leake,
BY
Neil D. Preston
ATTORNEY

R. C. LEAKE.
TIME RELEASE MECHANISM.
APPLICATION FILED AUG. 31, 1917.

1,384,533.

Patented July 12, 1921.
8 SHEETS—SHEET 8.

INVENTOR
Richard C. Leake,
BY
Neil D. Preston
ATTORNEY

UNITED STATES PATENT OFFICE.

RICHARD C. LEAKE, OF ROCHESTER, NEW YORK, ASSIGNOR TO GENERAL RAILWAY SIGNAL COMPANY, OF GATES, NEW YORK, A CORPORATION OF NEW JERSEY.

TIME-RELEASE MECHANISM.

1,384,533.     Specification of Letters Patent.     Patented July 12, 1921.

Application filed August 31, 1917. Serial No. 189,088.

*To all whom it may concern:*

Be it known that I, RICHARD C. LEAKE, a citizen of the United States, and resident of the city of Rochester, in the county of Monroe and State of New York, have invented a new and useful Time-Release Mechanism, of which the following is a specification.

This invention relates to apparatus for use in railway signaling and more particularly to a device commonly termed in the art a clockwork time release.

One of the objects of this invention is to provide a clockwork time release which may be operated by hand and which cannot be manipulated by the operator to speed up the time interval for which the device is set.

A further object of the invention is to provide a device of the kind set forth, the mechanism of which may be readily adjusted to change the time interval to any desired length within the limits of the device.

A further object of the invention is to provide a clockwork time release which shall be provided with a graduated dial and a pointer, the purpose of which will be not only to show the length of the time interval for which the device is set but to show continuously the time elapsed during the operation of said device.

A further object of the invention is to provide a device of the kind set forth which may be applicable to a large number of circuits and which by simple adjustments may be changed to control said circuits under a variety of different conditions.

A further object of the invention is to provide a clock work time release which will have a number of circuit controlling positions and a number of individual circuit controlling units in each of said positions, said units being adjustably adapted to be either normally open or closed in any of said positions.

A further object of the invention is to provide a clockwork time release which will include all of the above mentioned objects and to further provide a means for closing contacts at intermediate points in the travel of said device from one of its operated positions to another.

A further object of the invention is to improve the construction of time release mechanism in general and to so design and construct such a device that it will be durable, simple in its operation and adjustable over a wide range of control.

Other objects and advantages of the invention will more fully appear as the description of the invention progresses and the novel features of the invention will be particularly pointed out in the appended claims.

In describing the invention in detail reference is had to the accompanying drawings, wherein I have illustrated a preferred physical embodiment of the invention and wherein like reference characters designate corresponding parts throughout the several views, and in which:

Fig. 7 is a perspective view of one of the contact block units;

Fig. 11 is a fragmentary view showing, partially in elevation and partially in section, the driving and latching mechanism as shown in plan in Fig. 2 and is taken looking in the direction indicated by the arrow $e$ in Fig. 2;

Fig. 12 shows, in detail, a plan view and a view in elevation of the main driver as shown in Fig. 11;

Fig. 13 shows, in detail, a plan view and a view in elevation of the secondary driver as shown in Fig. 11;

Fig. 14 shows, in detail, two views of the locking dog, as shown in Fig. 11;

Fig. 19 is a fragmentary vertical section taken substantially on the line 19—19 in Fig. 2 looking in the direction indicated by the arrow $e$ and shows a means for adjusting the time cam;

Figure 1:
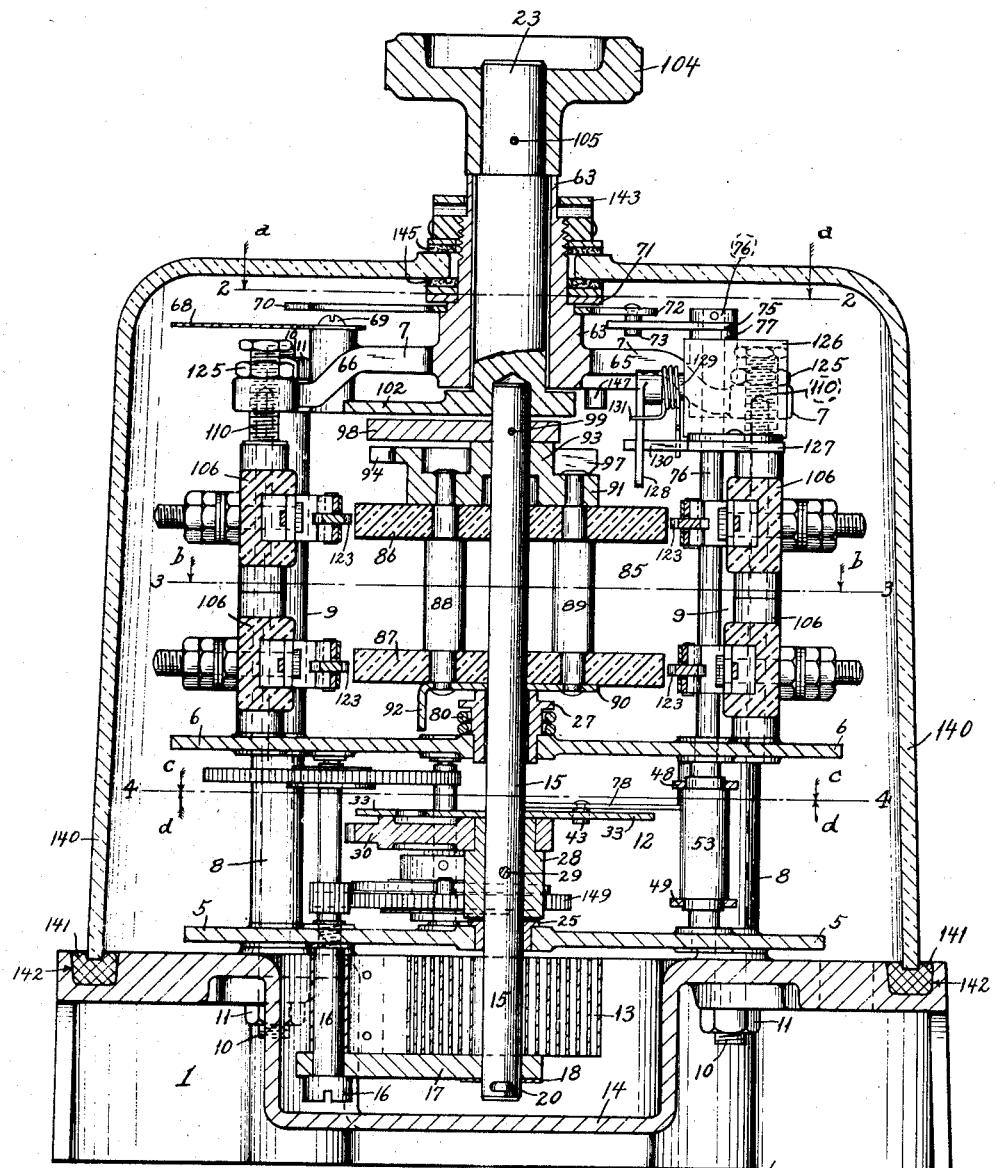
Figure 1 is a vertical section of the device taken substantially on a line 1—1, in Fig. 2 looking in the direction indicated by the arrows $y$.

Referring to Fig. 1 of the drawings, a base plate upon which the various parts of the device embodying this invention are mounted is represented by the numeral 1. The frame work of the device comprises a bottom plate 5, a top plate 6 and a bearing bracket 7. The two plates 5 and 6 are separated from each other and are also held rigidly together by spacers 8, which are pressed tightly into holes in each of said plates. The bearing bracket 7 is separated from the top plate 6 by means of spacers 9. Studs 10 pass through the bearing bracket 7, the spacers 9 and 8 and the base 1 and by means of nuts 11 screwed tightly down on either end of said studs 10, the bearing bracket 7 and the plates 5 and 6 are tightly clamped to the base 1, as shown in Fig. 19 of the drawings.

A clockwork mechanism 12 is mounted between the bottom plate 5 and the top plate 6 and comprises a train of gears driving an escapement pallet 22; said pallet coöperating with said gear train in such a manner as to at times retard the rotation of the gearing and to facilitate the regulating of the speed at which said gear train operates, as will be later explained.

A main spring 13 for actuating the clockwork mechanism 12 is inclosed in a recess 14 formed in the base 1, as shown in Fig. 1. The inner end of the main spring 13 is secured to a main shaft 15 and the outer end to a stud 16 which is screw-threaded into the bottom plate 5, as shown in Fig. 1. One end of a guide bar 17 for supporting the spring 13 is supported by the head of the stud 16 while the other end of said bar 17 is supported by the main shaft 15 and is held in place thereon by a washer 18 and a cotter pin 20.

The main shaft 15, as shown in Fig. 1, is arranged in a vertical position throughout the center of the mechanism and is journaled in bearings formed by bushings 25 and 27 which are pressed tightly into holes centrally located in the plates 5 and 6 respectively. A collar 28 which is secured to the shaft 15 by a pin 29, bears on the top of the bushing 25 and forms a thrust bearing for the shaft 15.

A segmental gear 30 is supported by the collar 28 and is adapted to be adjusted thereon. A saw slot 31 in the segmental gear 30 divides the bearing portion of said gear 30 and permits it to be rotatably adjusted on its bearing 28 and then be clamped thereto by means of a cap screw 32, as shown in dotted lines in Fig. 5. A circular cam plate 33 is secured to the segmental gear 30 by means of a cap screw 34.

Figure 5:
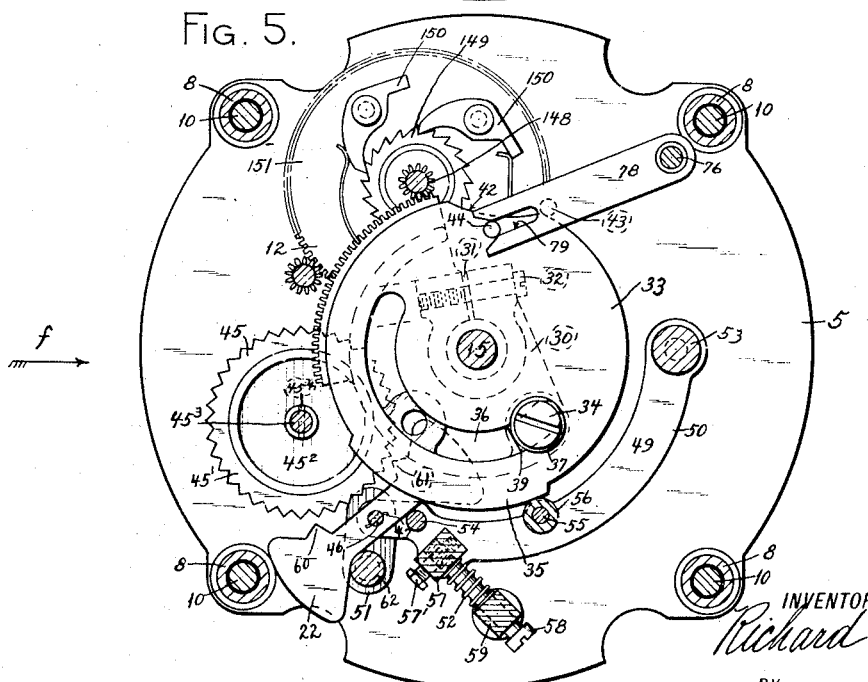

Referring to Fig. 5 it will be seen that the outer periphery of the cam plate 33, through an arc of approximately 80 degrees, is of a greater radial distance from the center of said cam plate 33, than the remainder of said periphery and hereinafter in the description this arc will be referred to as "the time cam face 35." Adjacent and in direct relation to the time cam face 35 in the cam plate 33 is an arcuate slot 36. The cap screw 34 passes through the slot 36 and is screw-threaded into the segmental gear 30. Between the head of the cap screw 34 and the cam plate 33, a washer 37 and a lock washer 38 are located (see Fig. 19). The washer 37 has a downwardly projecting ear 39 (see Fig. 5) formed thereon which fits into the slot 36 and prevents the cap screw 34 from backing off and the cam plate 33 from becoming loose after said cap screw 34 has been screwed down upon its lock washer 38. It will thus be readily seen that to adjust the cam plate 33 about its center for reasons hereinafter more fully explained that it is simply necessary to loosen the cap screw 34 which on account of the slot 36 will allow the cam plate 33 to be moved about its center to any desired position within the limits of the slot 36.

By referring to Fig. 19 it will be seen that when the device is fully wound up as will be later explained, the head of the cap screw 34 will come directly beneath a hole 40 in the top plate 6. It will also be seen from this figure that a hole 41 in the bearing bracket 7 is obliquely over the hole 40 in the top plate 6 so that a screw driver may be readily inserted through the two holes 40 and 41 and into a slot in the head of the cap screw 34. By loosening the cap screw 34 in the manner described it will be obvious that the cam plate 33 may be readily adjusted while the device is completely assembled.

Figure 17:
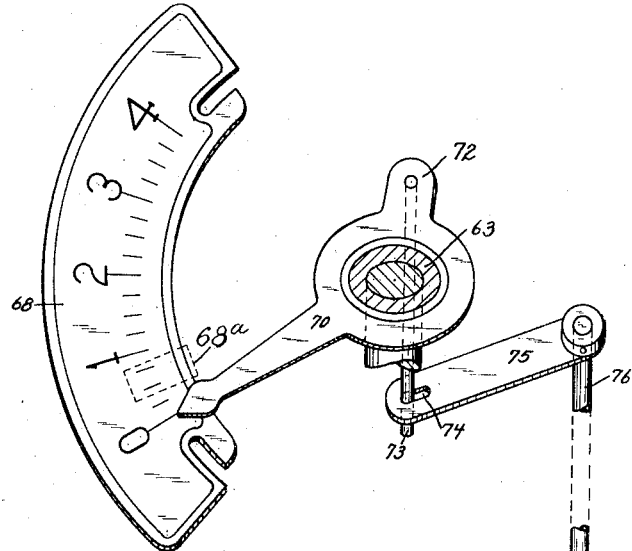
Fig. 17 is a perspective view showing in diagram, the timing mechanism together with the indicating parts, certain parts being exaggerated to more clearly bring out their operating relation to other parts.

Referring again to Fig. 5, it will be seen that the peripheral cam face of the cam plate 33 which lies diametrically opposite the time cam face 35, has an arc-shaped notch 42 cut therein, as shown in the above mentioned figure, to provide a clearance for a guide pin 43, the purpose of which will be more fully explained as the description proceeds. A pin 44 is securely fixed in the cam plate 33 and is located on a radial line through the center of the notch 42 as shown in Figs. 5 and 17.

An escapement wheel 45 is included in the train of gears above mentioned and comprises a ring $45^1$ having equally spaced teeth formed about its entire outer periphery, each of said teeth in the particular illustration herein shown being formed with equal angles on either side of a radial line passing through the apex of the tooth and the sides thereon forming a right angle at the root of the tooth with the adjacent side of the next tooth. The ring $45^1$ is pressed tightly on a circular bearing portion $45^2$ having a centrally located hub integral therewith which is loosely mounted on a shaft $45^3$ and operatively connected thereto by a pin $45^4$.

With the escapement wheel 45 connected to the shaft $45^3$ in the manner just described, said wheel is permitted, when the shaft is being rotated at high speeds, to aline itself thereon in a manner to prevent excessive vibration of the shaft when said wheel is unevenly balanced and to tend to distribute or break up any vibration of said shaft due to other parts coöperating therewith. The teeth on said wheel 45 being formed as described above not only facilitate in the manufacture of said wheels but provide a greater wearing surface for the teeth.

The pallet 22 which coöperates with the escapement wheel 45 of the train of gears consists of a flat metal bar having a hole midway between its ends which fits tightly over an oscillatable shaft 46 and is held vertically thereon by means of pins 47 which extend through said shaft 46 on either side of the pallet 22. The pallet also has two teeth 60 and 61 formed on one of its edges, which are located at equal distances on either side of its center, the sides of each of said teeth, in this particular embodiment of the invention, forming a right angle at the apex of the tooth and adapted when in mesh with the teeth on the escapement wheel 45 to practically coincide with the sides of the teeth thereon. The shaft 46 is loosely journaled in plates 48 and 49 of a pallet support 50. The ends of the shaft 46 are rounded and are guided between pads 51 formed on the top and bottom plates 6 and 5 respectively.

The pallet support 50, best shown in Fig. 17, consists of two arc-shaped side plates 48 and 49 which are separated from each other by spacing studs 53, 54 and 55, the whole support 50 being movable about the axis of the spacing stud 53 which is journaled at either end in the top plate 6 and the bottom plate 5, as shown in Fig. 1. The stud 55 carried by the side plates 48 and 49 revolubly supports a roller 56 which lies in the path of movement of the time cam face 35 and is adapted at times to coöperate therewith in a manner hereinafter more fully discussed. A rectangular shaped stud 57 is also loosely journaled in the side plates 48 and 49 and is adapted to receive the threaded portion of an adjusting screw 58 which is loosely supported, as shown in Fig. 5, in a squared stud 59 journaled at either end in the top plate 6 and the bottom plate 5. A spring 52 is mounted on the adjusting screw 58 between the studs 57 and 59 and acts to return the pallet support 50 to its normal position after it has been moved outward about its axis by the coöperation of the time cam face 35 and the roller 56.

The pallet support 50 may be readily adjusted about its axis by screwing the adjusting screw 58 either in or out as the adjustment may require. It will thus be seen that by so manipulating the adjusting screw 58, the escapement pallet 22 will be adjusted in its relation to the escapement wheel 45 of the gear train and the speed at which said gear train may operate will be varied accordingly. The stud 57 has a saw slot in its lower end and its sides are adapted to be drawn together by a screw 57[1], thus clamping the adjusting screw 58 after said support 50 has been set to any desired position.

When the pallet support 50 is in the position shown in Fig. 5, that is, when it has been moved about its axis by the action of the time cam face 35 on the roller 56, the teeth 60 and 61 of the escapement pallet 22 are out of engagement with the teeth of the escapement wheel 45. It will also be seen from the same figure that, when the pallet support 50 has been moved as stated, the escapement pallet 22 will assume a position, as shown, against a stop pin 62, securely mounted between the top plate 6 and the bottom plate 5, and also against the spacing stud 54. It will therefore be obvious that the escapement pallet 22 will not only be steadied upon its withdrawal from the escapement wheel 45 but will be held rigidly in an alinement that will assure a clearance between the teeth 60 and 61 of the escapement pallet 22 and the teeth of the escapement wheel 45.

The bearing bracket 7, as shown in Fig. 1, comprises a hub or central bearing portion 63 and four radial arms 64, 65, 66 and 67 disposed at right angles to each other. Each of the above mentioned arms have enlarged end portions, as shown in Fig. 2.

Figure 2:
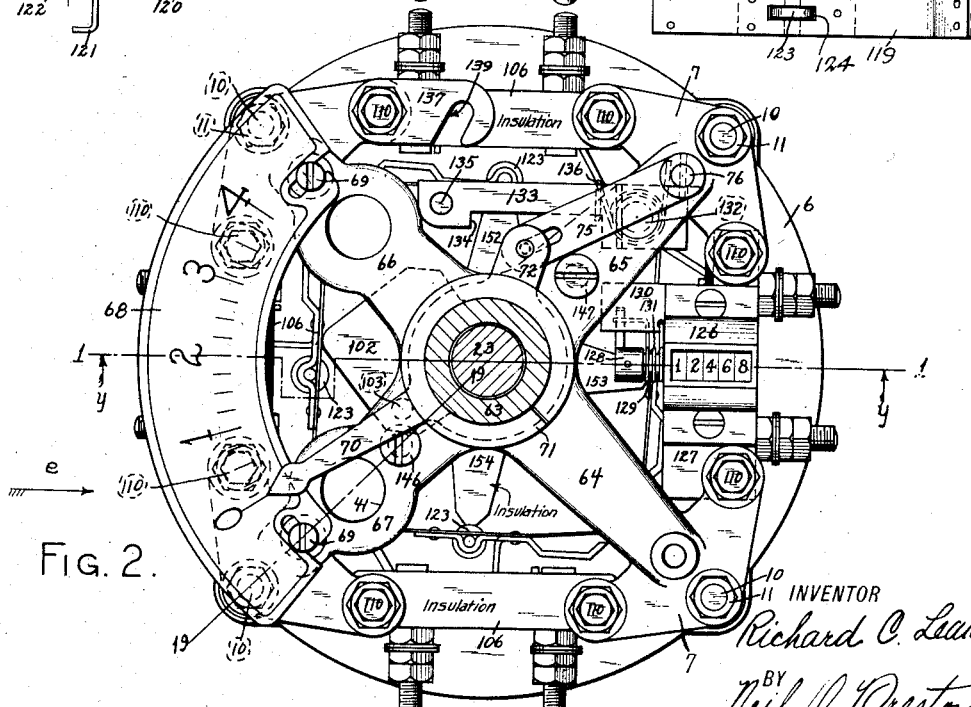
Fig. 2 is a horizontal section taken on the line 2—2, in Fig. 1 looking in the direction indicated by the arrows $a$, the glass casing and the base being omitted.

A dial 68 supported by the arms 66 and 67 is secured thereto by screws 69, as shown in Figs. 1 and 2. A pointer 70 adapted to coöperate with the dial 68 is loosely mounted on the hub 63 of the bearing bracket 7 and is held in place thereon by a split washer 71 which is pressed over the hub 63. An arm 72, integral with the bearing portion of the pointer 70 and extending laterally therefrom, carries a downwardly extending pin 73 which is securely fixed therein. This pin 73 is adapted to move freely in an elongated slot 74 located in one end of an arm 75 which is fixed at its opposite end to a shaft 76 and adapted to bear, at said end, on a boss 77 integral with the arm 65 of the bearing bracket 7.

The shaft 76 is journaled in said boss 77 and extends downwardly therefrom and through the top plate 6. An arm 78 is pinned to the lower end of the shaft 76, as shown in Fig. 17.

Referring to Figs. 5 and 17 it will be seen that the arm 78 is mounted on the shaft 76 in direct angular relation to the arm 75. A slot 79 in the free end of the arm 78 lies directly in the path of movement of the pin 44 on the cam plate 33. It will therefore be seen from Fig. 17, the device being set for maximum timing, that, for every degree of angular movement that the cam plate 33 is rotated about its center in the direction indicated by the arrow X, or in an opposite direction, the pointer 70, through the medium of the arms 75 and 78, will register a corresponding number of degrees of time on the dial 68. The guide pin 43 previously referred to is carried by the arm 78, extending downwardly from the bottom face thereof and is adapted to bear against the outer peripheral face of the cam plate 33 and to keep the slot 79 in the arm 78 always in the path of movement of the pin 44 in the cam plate 33 and the pointer 70 stationary.

Figure 4:
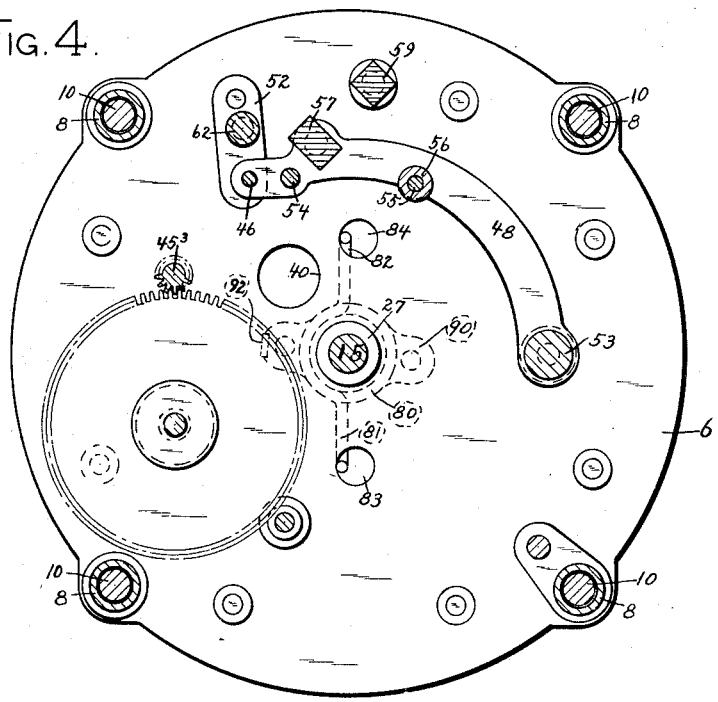
Figs. 4 and 5 are horizontal sections taken on the line 4—4, in Fig. 1 looking respectively in the directions indicated by the arrows $c$—$c$ and $d$—$d$ and showing in plan the arrangement of the clockwork mechanism and the parts directly associated therewith.
Figure 18:
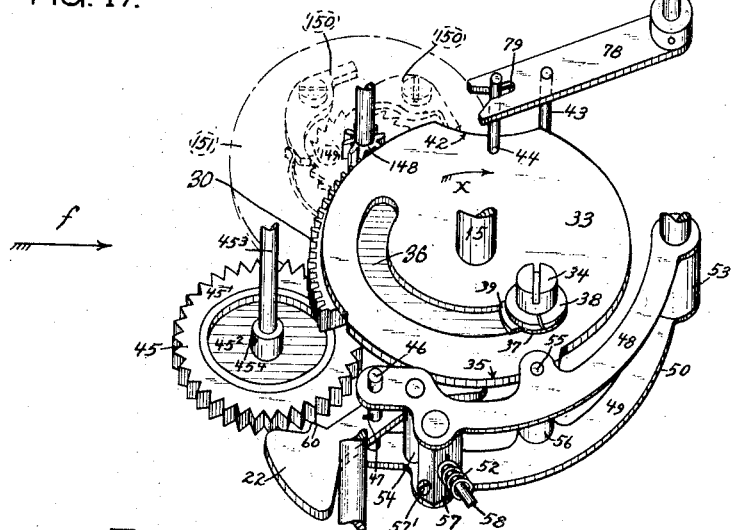
Fig. 18 is a fragmentary view showing a side elevation of the clockwork timing mechanism only, looking in the direction indicated by the arrow $f$ in Fig. 17.

A spring 80 (see Figs. 1 and 3) which is coiled around the bushing 27, in the top plate 6, has two laterally extending ends 81 and 82 which are bent downwardly at right angles and extend through holes 83 and 84 in the top plate 6, as shown in Fig. 18. The downwardly extending ends 81 and 82 of the spring 80 bear, respectively, slightly under tension, against one side of each of the holes 83 and 84, best shown in Figs. 3 and 4, for a purpose hereinafter more fully explained.

A contact operating unit 85, comprising two contact operating members 86 and 87 separated from each other by spacing studs 88 and 89 which are pressed tightly into holes in each of the said contact operating members 86 and 87; a plate 90 secured to the bottom side of the contact operating member 87 by the studs 88 and 89; and a secondary driving member 91 secured to the top side of the contact operating member 86 by the studs 88 and 89, is loosely mounted on the main shaft 15 and bears on the top of the bushing 27 in the top plate 6, all of which is clearly shown in Fig. 1 of the drawings.

Figures 3, 8:
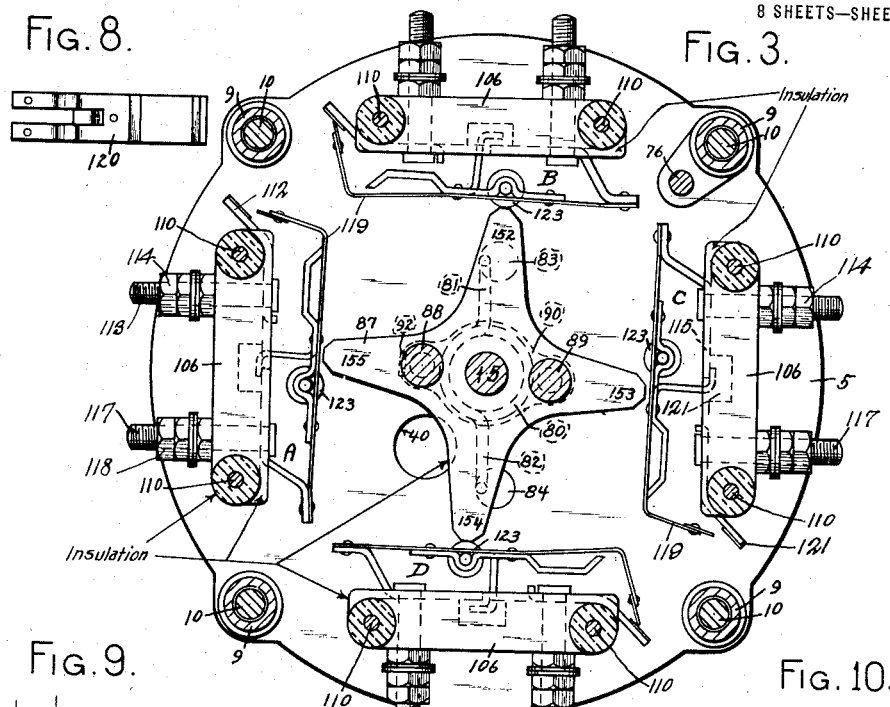
Fig. 3 is a horizontal section taken on the line 3—3, in Fig. 1 looking in the direction indicated by the arrows $b$ and showing the arrangement of the contact blocks together with the contact operating unit, the glass casing and the base being omitted.
Fig. 8 is a detail plan view of the contact retainer.

The contact operating members 86 and 87 as shown in plan in Fig. 3 and in elevation in Figs. 1 and 11, each have a central bearing portion and four arms integral therewith. These arms are arranged 90 degrees apart and are slightly beveled at their outer ends, as shown in Fig. 3. The plate 90 has a downwardly bent portion 92, as shown in Fig. 1, which is adapted to coöperate at times with the laterally extending arm 81 of the spring 80 for a purpose hereinafter more fully explained. The secondary driving member 91, two detail views of which are shown in Fig. 13, consists of a bearing portion 93; a latch portion 94; a laterally extending ear 95 integral with said latch portion 94 which carries an upwardly extending pin 95[1] rigidly fixed therein, as shown in Fig. 11; an upwardly extending driving lug 96, the inside face of which is cut at an angle as shown in the plan view of Fig. 13; and an arm 97 integral with the bearing portion 93 and extending radially therefrom.

Figure 15:
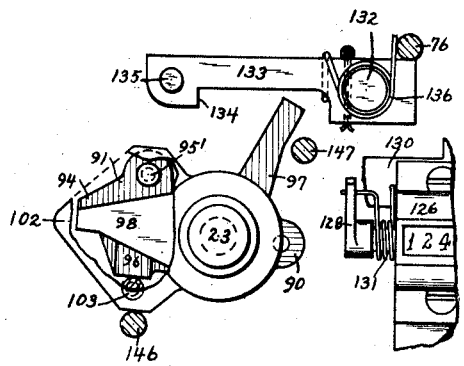
Fig. 15 is a fragmentary plan view of the driving and latching mechanism, showing the operating parts thereof in the normal or run down position, part of the main driver being shown broken away for the sake of clarity.

A locking dog 98, two detail views of which are shown in Fig. 14, is secured to the main shaft 15 by a pin 99, as shown in Fig. 1. The under side of the locking dog 98 bears on the top of the bearing portion 93 of the secondary driving member 91 and in the normal position of the latching mechanism, as shown in Fig. 15, it will be apparent that one edge of the locking dog 98 coincides with the angular face of the driving lug 96 on the secondary driving member 91.

Figure 16:
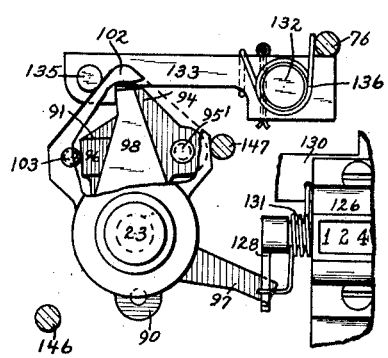
Fig. 16 is a view similar to Fig. 15 except that the parts are shown in the wound up and latched position of the device.

A main driver 23, two detail views of which are shown in Fig. 12, is journaled at its lower end on the upper end of the shaft 15. This driver comprises a shaft portion which fits loosely in the bore of the hub 63 on the bearing bracket 7 (see Fig. 1) and a laterally extending driving portion 102 formed on the lower end of said shaft portion. A part of each of the two sides of said driving portion 102 is cut away to form an oblique angle, the apex of which is rounded, as shown in the plan view of Fig. 12. A downwardly extending pin 103 is carried by said driving portion 102 and is adapted to coöperate at times with the driving lug 96 on the secondary driving member 91. Screws 146 and 147 screw-threaded into the arms 67 and 65, are adapted at their lower ends to act as stops for limiting the movement of the main driver 23 in either direction, as shown in Figs. 15 and 16.

A knob 104 is secured to the upper end of the shaft portion of the main driver 23 by a pin 105 and by means of this knob 104, the main driver 23 may be rotated as will be more fully explained in the description of the operation of the device which is to follow.

Fig. 7 as previously stated is a perspective view of a contact block unit and will be herein designated as a whole by the numeral 106. The contact unit 106 comprises an insulating block 107 of suitable insulating material said block being rectangular in shape and having, formed integral with its top and bottom faces, cylindrical bosses 108, as shown in Fig. 7. These bosses 108 have holes 109 therethrough adapted to receive holding studs 110 for securing said blocks to the frame work when assembled in the completed device. The insulating block 107 has a shallow depression 111 in one of its sides which is adapted to receive, at one end thereof, a contact arm 112 which is securely held to said block 107 by means of a bolt 113 which passes through said contact arm 112 and said insulating block 107 and forms a part of one binding post 114 of the contact block 106. At the opposite end of the depression 111 a support 115 for a contact member 119 is held rigidly in place by a bolt 117 which passes through said support 115 and said insulating block 107 and forms part of a second binding post 118 for the contact block 106.

Figures 9, 10:
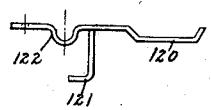
Fig. 9 is a detail side elevation of the contact retainer.
Fig. 10 is a detail plan view of one of the contacts together with the retainer and the roller as assembled therewith.

A resilient contact finger 119 is riveted at one end to the support 115, its opposite end being bent at an angle and adapted to make contact at times with the contact arm 112, as shown in Fig. 7. A retainer 120 which is riveted to the contact finger 119, as shown in detail in Figs. 8 and 9, consists of a strip of metal, slightly heavier than the contact finger 119, one end of which is slit into three strips, the center strip being bent downward to form a hook 121 while the remaining pair of strips are formed into a bearing 122 for a roller 123, as shown in Fig. 7. The hook 121 of the retainer 120, when the contact finger 119 is in its normal or open position is adapted to hook under the end of the support 115 and thus limit the outward movement of the contact finger 119. The roller 123 journaled in the bearing 122 is adapted to revolve freely therein and to project through a slot 124 in the contact finger 119, said roller also coöperating, as will be later explained, with one of the arms of the contact operating members 86 and 87.

Referring to Figs. 1 and 3 it will be seen that the contact blocks 106 are arranged in pairs on each of the four sides of a square formed about the main shaft 15 and in coöperative relation with the arms on each of the contact operating members 86 and 87. Each pair of the contact blocks is secured between the bearing bracket 7 and the top plate 6 by holding studs 110. The holding studs 110 have a threaded portion into which is rigidly fastened a long shank portion of smaller diameter. These studs are screw-threaded through bosses in the enlarged portions on the arms of the bearing bracket 7, the shank portion extending through the holes 109 in the contact blocks 106 and through the top plate 6. When the threaded portion of the stud 110 is screwed firmly down against the top of the boss 108 on the contact blocks 106 and locked in said position by lock nuts 125, each pair of contact blocks is held rigidly together and in operative relation to their respective arms on the contact operating members, all of which is clearly shown in the above mentioned figures, namely, Figs. 1 and 3.

The contact blocks 106 may be arranged so that the contacts thereon may be either normally open or normally closed as desired and may be changed from one of said conditions to the other by simply turning said contact blocks longitudinally over which may be done by removing the holding studs 110, without in any way changing any of the other parts of the device. Referring to Fig. 3, it will be seen that the contact blocks are arranged so that the contacts on two of said blocks are normally open whereas those on the other two blocks are normally closed.

Referring to Fig. 1 it will be seen that in the upper right hand portion of the device a counter 126 is shown which may be any of the ordinary crank operated counters. The said counter 126 is supported on a plate 127 which is securely held to the upper contact block by the threaded portion of the holding studs 110. An arm 128 is pinned to a shaft 129 of the counter 126 and is spring pressed in one direction against a stop arm 130 integral with the plate 127, by a spring 131 which is coiled around the shaft 129. The said arm 128 lies in the path of movement of the arm 97 on the secondary driving member 91 and is adapted to coöperate therewith so that the counter is operated each time the device is wound up as will be hereinafter explained.

The arm 65 of the bearing bracket 7 has a downwardly projecting stud 132 fixed therein, as shown in Fig. 11. A latch 133 pivotally supported, at one end, on the stud 132, as shown in Figs. 2 and 11, has a notch 134 cut in its free end which is adapted to engage the locking dog 98 and the latch portion 94 of the secondary driving member 91 when said device is completely wound up, as shown in Fig. 16, and to hold the rotating parts of the device in said wound up position until released as hereinafter described. The latch 133 bears an upwardly extending pin 135 rigidly secured thereto, best shown in Fig. 2, which is adapted to coöperate with the angular sides of the driving portion 102 of the main driver 23 as will be more fully explained hereinafter. The latch 133 is normally biased to an inward position, as shown in Fig. 2, by a spring 136 which is coiled around the stud 132, one of its ends being bent around the said latch 133 while the other of said ends bears against the shaft 76.

Referring to Fig. 2 it will be seen that a catch 137 is provided for the latch 133, said catch 137 being pivotally supported on one of the holding studs 110 between the lock nut 125 and a boss 138 on the enlarged portion of the arm 66 of the bearing bracket 7. The said catch 137 has a notch 139 cut therein, as shown in Fig. 2, which is adapted to be hooked around the pin 135 in the latch 133 to hold said latch out of engagement with the locking dog 98 and the latch portion 97 of the secondary driving member 91 when it is desired to operate the device without the latch 133 as will be more fully described in the discussion of the operation which is to follow.

Figure 6:
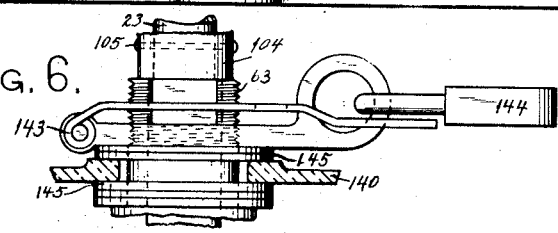
Fig. 6 is a fragmentary view showing a side elevation of the means for locking the case on the device after the parts have been adjusted.

The entire mechanism is protected, from improper manipulation of the operating parts and from dirt, by a glass casing 140, as shown in Fig. 1. This glass casing 140 is supported by the base 1 and rests on a gasket 141 secured in a circular groove 142 in the base 1, best shown in Fig. 1. The casing 140 is adapted, at the top, to fit over the hub portion 63 of the bearing bracket 7 and may be locked in place by a hasp 143 and a padlock 144 as shown in Figs. 1 and 6. The casing 140 is also protected from dirt at its top by felt washers 145 which are placed next to the glass and securely held in place by other metal washers between the hasp 143 and the hub 63 of the bearing bracket 7. It will therefore be obvious that when the casing 140 is in place and locked, and the knob 104 is fastened in place that it would be very difficult to interfere in any way with the operating parts.

Operation: The time release mechanism embodying the invention herein shown and described may be used in a variety of different ways to accomplish different results. The device may be operated by hand and may be used as a normally unwound device in which case as the device is herein shown the parts will be in the position shown in Figs. 2 and 3 of the drawings, that is, the contacts on the units A and C will be normally open whereas those on the units B and D will be normally closed and the pointer 70 will be opposite the zero position on the dial 68. It can be readily seen therefore that before the device can be used for timing circuits it will be necessary to operate it to its wound up position which may be done by turning the knob 104 as will be later explained. On the other hand the device may be used as a normally wound up device and in which case the device will be installed always in the wound up or latched condition with the pointer registering opposite the position on the dial corresponding to the length of the time interval for which the device is set which in the case herein considered is four minutes, therefore, in this case, the pointer would be opposite the figure 4 on the dial. It will now be seen that to start the device on a timing operation it is only necessary to release the latch 133 by a slight turn of the knob 104 to the left, as will be hereinafter more fully set forth.

The device as herein shown and described may also be used in connection with circuits controlled by a hand operated or power operated interlocking machine in which case the knob 104 is replaced by a suitable mechanical attachment to a lever of said interlocking machine.

The latch 133 is always used when the device is used as a normally wound up device but in the case where the device is used as a normally unwound device, the latch may or may not be used and when used it may serve as a positive check that the device is in the full wound up position or it may serve to hold the device in said wound up position when it is desired to reset the device to change the time interval for which the device is set, likewise when the device is used in connection with an interlocking machine the latch 133 may or may not be used and when used a suitable arrangement is provided in connection with the lever or otherwise for withdrawing said latch and releasing the mechanism.

A time interval device of the kind herein set forth may also be used in connection with remote control devices and in such cases means may be provided for controlling said device from a distant point.

When the device as above stated and as herein shown and described is to be operated by hand as a normally unwound device with the latch 133, all the operating parts being in their normal position as shown in Fig. 2, it is simply necessary for the operator to take hold of the knob 104, shown in Fig. 1, and to turn it, in a clockwise direction, through an angle of approximately 80 degrees or until the driving portion 102 of the main driver 23 engages the stop pin 147 in the arm 65 of the bearing bracket 7.

The turning of the knob 104 in the direction stated causes the main driver 23 to be turned in a similar direction and its driving pin 103 to engage the driving lug 96 on the secondary driving member 91, best shown in Fig. 11, and to rotate said member and consequently said contact operating unit 85 in the direction stated. When said secondary driving member 91 is rotated in the direction stated, its driving lug 96 engages and drives the locking dog 98 and consequently the main shaft 15 to which said locking dog is pinned. The turning of the main shaft 15, as stated, causes the main spring 13 to be wound up and as the segmental gear 30 is secured to the bushing 28 which is pinned to the main shaft 15, said gear 30 will also be rotated in a clockwise direction.

Referring to Fig. 5, it will be seen, that, when the segmental gear 30 is rotated in a clockwise direction as above stated, the pinion 148 and the ratchet 149 will be rotated in a counterclockwise direction and as a result the pawls 150 on the ratchet gear 151 will slip over the teeth of said ratchet 149 without driving the ratchet gear 151 and consequently the remainder of the gear train, as will be well understood by those skilled in the art of clockwork mechanisms. From the same figure it will also be seen that as the segmental gear 30 is rotated, as stated, the time cam face 35 of the cam plate 33 will be rotated in the same direction and will move out of engagement with the roller 56. When said time cam face 35 moves out of engagement with the roller 56, the spring 52 on the adjusting screw 58 causes the pallet support 50 to be turned about its axis until the head of the adjusting screw 58 comes into contact with the stud 59 at which time the pallet 22 will be in coöperative relation to the escapement wheel 45 of the gear train.

As the members 23, 91 and 98 are being rotated as explained above, one of the angular sides of the driving portion 102 of the main driver 23 engages the pin 135 on the latch 133 and lifts said latch 133 out of the path of movement of the locking dog 98 and the latch portion 94 of the secondary driving member 91 and will hold said latch 133 out of engagement with said members 91 and 98 until they have assumed their full "wound up" position at which time the latch 133 due to its bias will assume a locking position as shown in Fig. 16 and will hold said members 91 and 98 and consequently all of the rotating parts against movement in a counterclockwise direction.

Referring to Fig. 3 it will be seen that the contacts of the contact blocks 106, herein for convenience designated by the letters A, B, C and D, are normally open on the blocks A and C while those of the blocks B and D are normally closed. Since the secondary driving member 91 is a fixed part of the contact operating unit 85, it will also be apparent that as said driving member 91 is rotated, in the direction stated, the contact operating members 86 and 87 and the plate 90 will be moved correspondingly and as a result the arms 152 and 154 of the contact operating member 87, as shown in Fig. 3, will be moved out of engagement with the roller 123 on the contact blocks B and D, thus removing the force which held the contacts 112 and 119 on said blocks closed and allowing the contact finger 119 to quickly open and consequently to interrupt at the beginning of the rotating movement any circuit which may have been traced through said contact blocks B and D.

The said arms 152 and 154 of the contact operating member 87 will travel, as previously stated through an angle of approximately 80 degrees and after leaving the rollers 123 on the contact blocks B and D will engage the rollers 123 on the contact blocks A and C and cause the contact fingers 119 to make contact with the contact arms 112 on said blocks A and C, thus closing any circuit which may have been traced through said contact blocks. However, the arms 155 and 153 on the contact operating member 87, with the contact blocks A, B, C and D arranged as shown in Fig. 3, will not travel far enough to engage the rollers 123 on the contact blocks B and D. Thus it will be seen that the contacts on these blocks after being once opened will remain in that condition as long as the device is in its wound up position. On the other hand if the arrangement of the contact blocks A, B, C and D had been such that all of said blocks had been normally open, instead of only two, as shown in Fig. 3, then the arms 155 and 153 would have engaged the rollers 123 on the contact blocks B and D and would have caused their respective contacts to have been closed.

The downwardly extending portion 92 of the plate 90 which is rigidly fixed to the contact operating arm 87 and adapted to move therewith, engages the laterally extending end 81 of the spring 80 and through the last few degrees of movement of the contact operating unit 85, the spring 80 is put under tension, thus forming a bias for the contact operating unit 85 when it is in its wound up condition.

The arm 97 on the secondary driving member 91 engages the arm 128 on the counter 126, as the device is wound up, and moves said arm 128 a sufficient angular distance to operate the counter 126.

The time release as herein shown and described is to be considered as being set for "four minute timing," that is, that after the device has been fully wound up and released, a space of time equal to four minutes will be consumed between the time that the device is released and the time that it is completely run down and its contacts closed. However, it is to be understood that the device may be set to consume any part of the four minutes by adjusting the cam plate 33 as hereinbefore described.

Referring to Figs. 2, 5 and 17, it will be seen that when the cam plate 33 is rotated in a clockwise direction as described above, the pin 44 which is carried thereon will enter the slot 79 on the arm 78 and, as said cam plate 33 rotates, will drive the arm 78 and consequently the shaft 76 and the arm 75 about their pivot point in a counter-clockwise direction. The arm 75 at its outer end bears against the pin 73 carried by the pointer 70 and as said arm 75 is rotated in the direction stated, the pointer 70 will be rotated about its axis in an opposite or clockwise direction.

By referring to Figs. 2 and 5 it will be seen that the pins 44 and 73 are of the same radial distance from the center of the device and also that they are located one directly above the other. It will also be noticed that the arm 75 and the arm 78 are exactly the same length and are also located on their shaft one directly above the other. Therefore since the parts of the timing device are all relatively proportioned and since the spring motor will rotate the device at a constant speed during the timing period, it can be readily seen that for every angular degree of movement of the cam plate 33, the pointer 70 will indicate an equivalent number of units of time on the dial 68.

As previously stated the total movement of the operating parts from the "run down" position to the "wound up" position is approximately 80 degrees and when the device is completely wound up the pointer 70 is opposite the numeral 4 on the dial, thus it can be seen that when the device has been released, as will be explained hereinafter, and the pin 44 on the cam plate 33 has been rotated in a counterclockwise direction through an angle of approximately 20 degrees, there will have elapsed a time interval of one minute and the pointer 70 will be opposite the numeral 3 on the dial 68 indicating that the device has already consumed one minute of the predetermined four minutes and still has three minutes to run before its cycle is completed.

When a time interval is desired other than the "four minute timing" at which the device herein shown and described is set, it is only necessary to wind up the device in the manner herein described, to loosen the cap screw 34 which holds the cam plate 33 and to move the pointer 70 to indicate on the dial the time at which the device is desired to be set and then tighten up the cap screw 34. The set screw 58 is used as a time regulator and by means thereof the setting of a time interval may be more finely adjusted than would otherwise occur by the method above described.

Assuming that the device is in the "wound up" condition and that all the operating parts have operated as set forth in the preceding paragraphs, the operator now wishing to release the mechanism, to start a timing operation, simply has to turn the knob 104 a few degrees in a counterclockwise direction whereupon one of the angular faces on the driving portion 102 of the main driver 23 engages the pin 135 on the latch 133 and forces said latch 133 out of engagement with the locking dog 98 and the latch portion 94 of the secondary driving member 91.

As soon as the locking dog 98 and the secondary driving member 91 are released from the latch 133 they are acted upon by their respective springs 13 and 80 and since the contact operating unit 85, of which the secondary driving member 91 is a part, is free from any retarding action it will move for a few degrees with a quick movement until its movement is arrested by the stop pin 95$^1$ on the secondary driving member 91 which comes into contact with the locking dog 98. It will therefore be apparent from the quick movement just described that a quick opening is provided for the contacts on the contact blocks A and C which were closed in the "wound up" position and likewise for any other block that may be closed in that position. It will also be noted that, when the quick movement of the contact operating unit 85 is completed, the tension on the spring 80 has been removed and the downward extending end 81 of the spring 80 will come to rest against the side of the hole 83 so that it will have no further operating effect on the said unit 85. The arm 128, on the counter 126, is biased by the spring 129 and will return to its normal position against the stop arm 130 on the plate 127.

The main shaft 15 being acted upon by the main spring 13 after said locking dog 98 has been released by the latch 133 will rotate as stated in a counter clockwise direction and will cause a similar action of the parts which are rigidly fixed thereto, namely, the locking dog 98 and the segmental gear 30. The rotation of the segmental gear 30 as stated sets in motion the clockwork mechanism 12 but owing to the action of the escapement pallet 22 on the escapement wheel 45 the rotation of the main shaft 15 and the parts fixed thereto is retarded in a manner well understood by those skilled in the art of clockwork mechanisms and is so timed that the mechanism, as the device is herein shown, will consume exactly four minutes to run from the full wound up position to the full run down position.

When the clockwork mechanism 12 in running down, as described above, has consumed all but the last few seconds of the time for which the device is set, the time cam face 35 of the cam plate 33 engages the roller 56 of the pallet support 50 and forces said support 50, and consequently the teeth 60 and 61 of the escapement pallet 22, out of engagement with the teeth on the escapement wheel 45 thereby removing the retarding action on the clockwork mechanism 12 and allowing said clockwork and said main shaft 15 to run freely for the remainder of its rotation and to quickly close any of the contact pairs that are to be normally closed in the run down position.

When said main shaft 15 is released, as just described by the withdrawing of the escapement pallet 22 from the escapement wheel 45, the locking dog 98 on the shaft 15 will engage and drive the secondary driving member 91 which is a part of the contact operating unit 85, in a counterclockwise direction, said member 91 in turn engaging the pin 103 on the main driver 23 and returning said driver 23 to its normal position against its stop pin 146 as shown in Fig. 2. When the main driver 23 comes in contact with its stop pin 146, as just described, it will be noted that the rotation of all of the operating parts with the exception of the gear train will be stopped, the gear train in order to avoid shock thereto caused by the sudden stopping of the parts, being allowed by its ratchet wheel 151 to run freely until it is stopped by friction as will be well understood by those familiar with ratchet wheels in clockwork mechanisms.

From the foregoing description in the preceding paragraph it will be seen that the rapid movement of the operating parts at the final part of their movement will cause the arms 152 and 154 on the contact operating members 87 and likewise 86 to again engage the rollers 123 on the contact blocks B and D and to quickly close the contacts 112 and 119 on said blocks.

When the device embodying the invention herein shown and described, is used with a hand operated or power operated interlocking machine the construction of the mechanism is identical with that just described for hand operation with the exception that instead of the knob 104, a suitable mechanical attachment is used and also the latch 133 may or may not be used. When the latch 133 is not used it is hooked up by the catch 137, as hereinbefore described. The operation of the device when used as stated with an interlocking machine is the same as above described for the hand operation except that when the latch 133 is not used the mechanism will start to run down immediately upon reaching its wound up position without further operation by the operator.

It will be noted that the timing action of the apparatus embodying the invention herein shown and described is entirely automatic in its action, the time required for a complete movement from the wound up position to the run down position depending only on the angle of adjustment between the time cam face 35 on the cam plate 33 and the roller 56 on the pallet support 50. Under no circumstances is the operator able by manipulating the knob to shorten the time for which the device is set.

A time interval device of the kind herein shown and described may be used in connection with the circuits controlled from interlocking machines for railways or it may be used for controlling signal circuits and the like or obviously for various other purposes where it is desired to have a predetermined lapse of time between the closing or opening of electric circuits.

Figure 25:
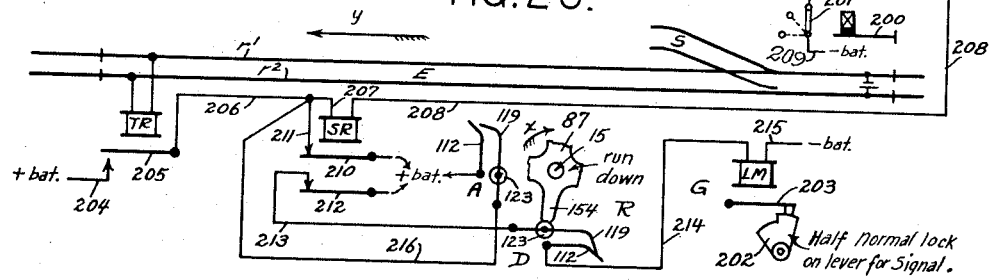
Fig. 25 is a circuit diagram showing the time release mechanism in its normal run down condition applied to an electric interlocking system for the control of an interlocked signal and switch.
Figure 26:
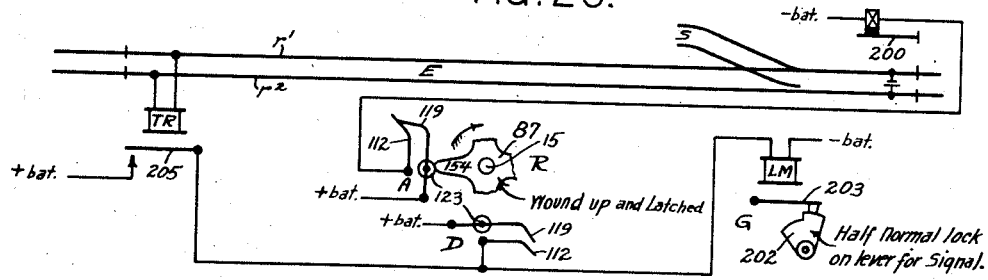
Fig. 26 is a view similar to Fig. 25 except that the time release is shown as a normally wound up device.

The utility of a time interval device of the above character, may be more readily appreciated by referring to the circuit diagrams shown in Figs. 25 and 26 wherein the device is shown applied to an electric interlocking system for controlling an interlocked signal and switch.

In Fig. 25, a stretch of track is shown which constitutes a single block E of an interlocked block signaling system and comprises the usual track circuit including a track relay TR, the track rails $r^1$—$r^2$ and the track battery. A signal 200 is shown for governing traffic over the block E, in the direction indicated by the arrow $y$. Said signal is of the well known type of semi-automatic block signals and is controlled in a manner familiar to those skilled in the art of interlocked block signaling. A switch S is shown associated with the block E, said switch being operated in the usual manner and controlled by a lever on an interlocking machine which is located in the tower of the interlocking plant. The construction of the switch operating mechanism and its controlling lever are old and will be well understood by those skilled in the art without further discussion.

A locking device G, which is also well known in the art, is provided for locking the signal lever in its half normal or normal indication position, against movement to its full normal position, after having been reversed. The device G comprises a locking cam 202 which is operatively connected to the signal lever in any convenient way and adapted to be oscillated by the movements thereof. A magnet LM is also associated with the locking device G, having an armature 203, which forms a latching member which coöperates with the locking cam 202 to hold the signal lever against movement in one direction after it has traveled a predetermined part of said movement.

The time release mechanism R is shown diagrammatically in its run down condition and for the sake of simplicity, only the parts of the apparatus that coöperate to open and close the circuits to be discussed, are shown. The numerals of the various parts correspond with those shown on similar parts in Fig. 3.

Assume that the various devices shown in Fig. 25 are in their normal positions; that no train is present in the block E; and that the signal 200, which is always under the control of the operator at the tower when the block E is unoccupied, is in its danger position. The track relay TR, therefore, is energized, for reasons well understood, and its armature 205 is picked up, thereby interrupting a control circuit for the stick relay SR which may be traced as follows: From positive battery along wire 204, to the back contact of the relay TR, armature 205 of said relay, wires 206 and 207, the coil of stick relay SR, wire 208, arm 201 of the circuit breaker on signal 200 in its danger position and wire 209 to negative battery.

However, with the signal 200 in its danger position and with the track relay energized, the stick relay is energized through its stick circuit which may be traced as follows: from positive battery through armature 210 of the relay SR picked up, a front contact of said relay, wires 211 and 207, the coil of relay SR, wire 208, arm 201 of the signal circuit breaker in its danger position and wire 209 to negative battery.

The magnet LM for the locking device G is normally energized by a circuit traced as follows: from positive battery through an armature 212 and a front contact on the stick relay SR, wire 213, contact fingers 119 and 112 of the circuit controlling unit B of the time release R, which are closed by an arm of the contact operating member 87 when the time release is in its run down position, wire 214, the coil of the magnet LM and wire 215 to negative battery. The latch 203 is therefore picked up, thereby allowing the signal lever to be operated to its full normal position.

Although the operator in the tower is allowed to change the indicating position of the signal 200 at any time except when the block E is occupied, the mechanism of the interlocking machine is so arranged that the switch lever can only be moved to operate the switch S from its normal to its reverse position or vice versa when the signal lever is in its full normal position, as will be well understood by those skilled in the art.

Should the operator wish to set up a route, over the block E, for an approaching train, he would operate the signal lever to its reverse position and in a well known manner cause the signal 200 to change from its horizontal or danger position to its vertical or clear position. The movement of the signal 200 to the clear position causes its circuit breaker arm 201 to assume a corresponding position, thereby interrupting the stick circuit for the stick relay SR and causing its armatures 210 and 212 to drop. The dropping of the armature 212 makes a break in the circuit for energizing the locking magnet LM of the locking device G, thereby deenergizing said magnet and allowing its latch 203 to drop into the notch of the locking cam 202 for preventing the return of the signal lever to its full normal position.

When the approaching train enters the block E in the direction indicated by the arrow $y$ the track relay will be deënergized, thus causing its armatures to drop and the signal 200 to automatically go to danger, all of which will be well understood by those skilled in the art. The dropping of armature 205 of the track relay TR and the movement of the circuit breaker arm 201 of the signal 200 to its danger position closes both of the breaks in the control circuit for the stick relay SR, causing it to again become energized and its armatures to be picked up.

The picking up of armatures 210 and 212 of the stick relay reëstablishes the stick circuit for the stick relay SR and also the circuit for energizing the locking magnet LM of the locking device G. The latch 203 is therefore raised and the locking cam is released allowing the signal lever to be returned to its full normal position. As soon as the train passes out of the block E, the track relay TR again becomes energized and its armature 205 is picked up, thereby interrupting the control circuit for the stick relay SR. The stick circuit for the relay SR, however, maintains the stick relay in its energized condition allowing all of the other associated devices to remain in their normal positions as shown in Fig. 25.

If the operator, after setting up the route for the approaching train, as previously described, should change his mind for any reason and decide to route said train over the switch S instead of over the main track, he would first change the signal 200 from its clear position to its danger position by moving the signal lever from its reverse position to its half normal or normal indication position. Before he can operate the switch lever he must put the signal lever in its full normal position, but since the stick relay is at this time deënergized, the magnet LM is also deënergized and the latch 203 is in its lower position. It will therefore be apparent that with the latch 203 in its lower position the operator is prevented from getting the signal lever to its full normal position and, consequently, as hereinbefore stated, cannot operate his switch lever to move the switch S from its normal to its reverse position.

With conditions, as above stated, it becomes necessary for the operator to use his time release mechanism and he does so by operating said device to its wound up or latched position; releases the latch and permits the device to run down automatically, thereby consuming the predetermined length of the time for which the device has been adjusted. When the device is in its wound up position, the arm 154 on the contact operating member 87 engages the roller 123 and closes contact fingers 119 and 112 on the circuit controlling unit A. The closing of said contact fingers establishes a circuit for energizing the stick relay SR, which may be traced as follows: from positive battery to contact finger 112, contact finger 119 on unit A, wire 216 and 207, the coil of the stick relay SR, wire 208, arm 201 of the signal circuit breaker, and wire 209 to negative battery.

Although the mechanism remains in its wound up position only long enough to latch and be unlatched, the length of time is sufficient to hold the contact fingers 119 and 112 on the unit A closed long enough to pick up the stick relay SR, after which the stick circuit becomes effective and maintains said relay in its picked up condition. It will be readily seen, therefore, that with the armature 212 on the stick relay SR picked up, the only break in the control circuit for the locking magnet LM, of the device G exists at the contact fingers 119 and 112 of the unit D which are biased to open when the device is wound up, and this break is closed as soon as the device runs down. The latch 203 will then be picked up and the signal lever released, thereby allowing the operator to pull said lever to its full normal position and thereafter to operate the switch lever and throw the switch S.

From the foregoing description of the application of the time release device it will be obvious that the operator after having set up one route for a train is compelled to consume a certain predetermined length of time before he can change that route and set up another for the same train, and is therefore prevented from throwing the switch in front of an approaching train in case said train is about to accept the signal for the route which was originally set up.

The diagram shown in Fig. 26 illustrates a different application of the time interval device. In this diagram the stick relay is omitted, the time release device is shown normally in its wound up and latched position, the locking magnet of the device G is normally deënergized, and the control circuit for the signal 200 is taken through a pair of normally closed contact fingers on the time interval device. The construction and operation of the various devices is the same as described for Fig. 25 and further discussion is considered unnecessary.

Assuming that the various devices are arranged as shown in Fig. 26 and that the operator after having set up a route for an approaching train has, for any reason, decided to change said route, and after pulling the signal lever from its reverse position toward its normal position finds, as before, that it is locked against movement to the full normal position. He then turns to the time release device, which in this scheme is normally in its wound up and latched position; releases the latch and permits the device to run down automatically and to consume the predetermined length of the time for which the device has been adjusted.

When the device reaches its run down position and the arm 154 engages and closes contact fingers 119 and 112 on the circuit controlling unit D, a pick up circuit for the locking magnet LM, of the device G is established. The latch 203 is then lifted and the signal lever is free to be pulled to its full normal position. However, since the control circuit for the signal is taken through a pair of contacts on the time release device which are normally closed in the wound up position of the device, it becomes necessary for the operator to re-wind and latch the device in order to close said pair of contacts before he can again have control over the signal.

With the arrangement as shown in Fig. 25 the operator is required to wind up and latch the time release device and then unlatch said device; whereas in the arrangement shown in Fig. 26 he is only required to release the latch and is then free to perform other duties. The winding up of the device as required in the latter scheme simply insures that the device will always be returned to its normal position.

When a device of the type herein shown and described is used, it will be obvious to those skilled in the art of time interval devices that a number of conditions will have to be met which will require various modifications in the device, as for instance it may be found necessary to close an intermediate circuit when the device is only partly run down or it may be desired to have a circuit closed when the device is completely wound up and to hold said circuit closed after the release has been made and until the mechanism is almost run down.

Figure 20:
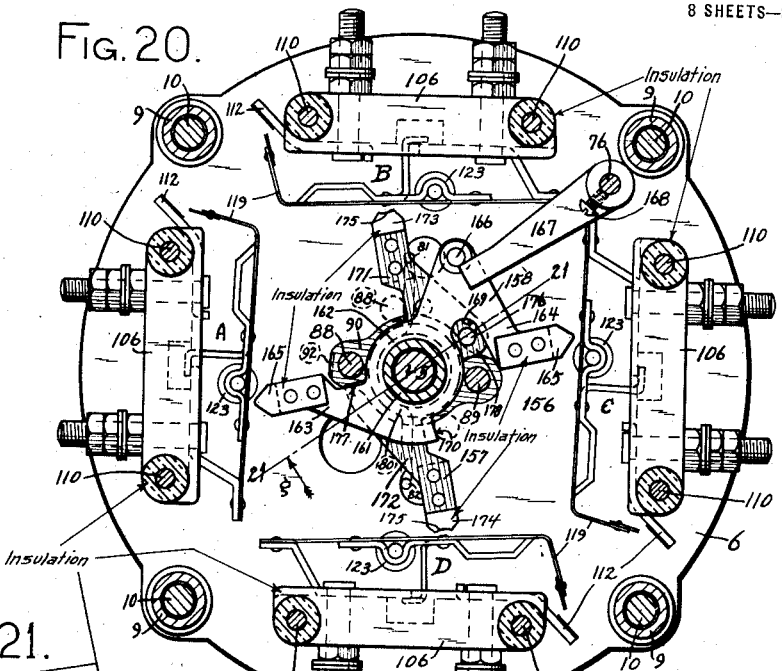
Fig. 20 is a view similar to Fig. 3 except that a modified form of operating unit is shown in its normal or run down position.
Figure 21:
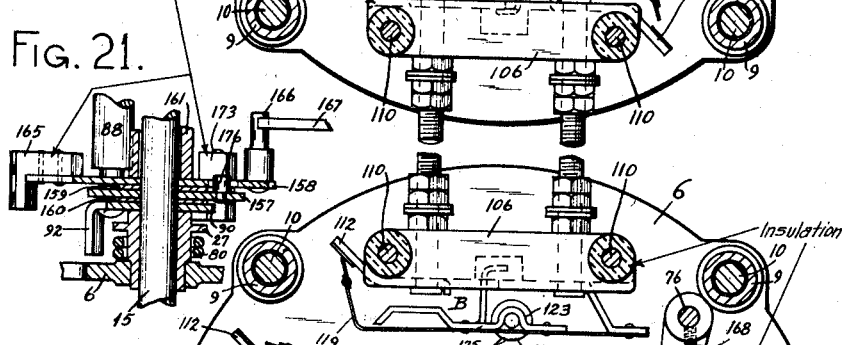
Fig. 21 is a fragmentary vertical section taken substantially on the line 21—21 in Fig. 20 looking in the direction indicated by the arrow $g$.
Figure 22:
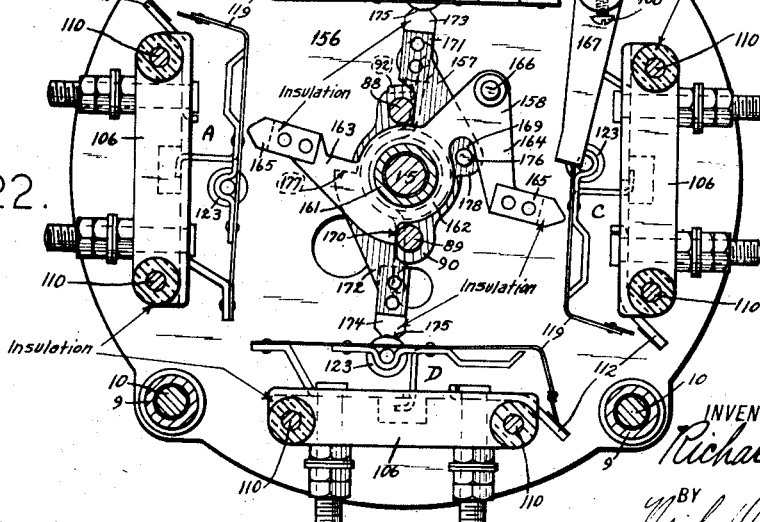
Fig. 22 is a view similar to Fig. 20 except that the parts are shown in their wound up or latched position.

Referring to Figs. 20, 21 and 22, a modification is shown for closing intermediate contacts after the device which is herein shown set for "four minute timing," has consumed slightly more than three minutes of the predetermined time. The construction of the device in this case is the same as before except that instead of the contact operating arm 87, as shown in Fig. 1, a new form of contact operating arm is used and an additional arm is carried on the shaft 76 as shown in Figs. 20, and 22.

The intermediate contact operating member herein designated as a whole by the numeral 156 consists of two independent members 157 and 158 loosely journaled on the main shaft 15, separated from each other by a washer 159, from the plate 90 by a washer 160 and from the contact operating member 86 by a spacer 161 loosely mounted on the main shaft 15. The member 158 consists of a bearing portion 162 and two irregular shaped arms 163 and 164 integral therewith as shown in Fig. 20. Each of said arms 163 and 164 have pieces of insulating material 165 fixed to their outer diametrically opposite ends which are adapted to engage, at times, the rollers 123 on the contact blocks A and C, respectively. A stud 166 is rigidly secured in the arm 164 and lies in the path of movement of an arm 167 which is adjustably secured to the shaft 76 between the top plate 6 and the bearing bracket 7 in any convenient manner as by a set screw 168. A slot 169 is formed between the arm 164 and the bearing portion 162 of the member 158. A notch 170 is also formed in the bearing portion 162 all of which is clearly shown in Fig. 20. The member 157 which is located on the main shaft 15 underneath the member 158 and separated therefrom by the washer 159, consists of a main bearing portion 171 and two irregular shaped arms 171 and 172 integral therewith, as shown by the shaded portion in Fig. 20. Each of the arms 171 and 172 have insulating pieces 173 and 174 respectively secured to their outer diametrically opposite ends which are adapted to engage at times the rollers 123 on the contact blocks B and D respectively. Each of the said insulating pieces 173 and 174 have notches 175 cut in their outer ends which are adapted to engage the rollers 123 and to hold said member 157 in a locked position until released as later more fully explained. The arm 171 on a laterally extending portion 178 thereof bears an upwardly extending pin 176 securely fixed thereto which is adapted to move freely in the slot 169 in the arm 164 of the member 158 to keep the two members 157 and 158 in alinement. A notch 177 is also formed in the bearing portion 171 of the member 157 as shown in Fig. 20.

The operation of the mechanism when the intermediate contacts are used is the same as before described when the contact operating member 87 was used, except that the intermediate contact operating member 156 instead of being a part of the contact operating unit 85, as was the member 87, is loosely mounted on the main shaft 15, as described above, and is driven by the lower portion of the spacing studs 88 and 89.

Referring to Fig. 20 it will be seen that when the device is wound up as described hereinbefore the spacing studs 88 and 89 being rotated in a clockwise direction will travel freely until the spacing stud 89 engages the notch 170 in the member 158 as shown in dotted lines in Fig. 20. When the said stud 89 engages the said notch 170 and continues to rotate in a clockwise direction, the member 158 will be rotated correspondingly and after said stud 89 has rotated a few degrees farther in the direction stated it will also engage the arm 172 of the member 157 and at this point the stud 88 will also engage the arm 171 of the member 157 and for the remainder of the winding operation the members 157 and 158 will both be driven by the studs 88 and 89. As the member 157 reaches its wound up position its arms 171 and 172 will engage the rollers 123 on the contact blocks B and D respectively and will cause the contacts 112 and 119 on said blocks to be closed. The member 157 will also become locked in this position as hereinbefore described and as shown in Fig. 22.

When the mechanism is released as hereinbefore described and said mechanism starts to run down the shaft 76 will be rotated in a clockwise direction, in a manner fully brought out in the preceding description. The arm 167 being securely fixed to the shaft 76 will rotate in a corresponding direction and will engage the stud 166 in the member 158 and will force said member 158 about its center in a counterclockwise direction. After a predetermined amount of time has been consumed the arms 163 and 164 on the member 158 will engage the rollers 123 on the contact blocks A and C and will cause the contacts 112 and 119 on said blocks to be temporarily closed or for such a length of time as it takes for the arms 163 and 164 to pass over said rollers 123 after which time the said contacts on the blocks A and C will again assume their open position. The spacing studs 88 and 89 will rotate in a counterclockwise direction after the release has been made but will do no work until the said stud 89 engages the laterally extending portion 178 on the arm 171 of the member 157 which it does when the mechanism is almost run down. When the stud 89 engages the portion 178 as just described it will force the member 157 out of its locked position on the rollers 123 as shown in Fig. 22 and as a result the contacts 112 and 119 will again be opened.

It will be noted by referring to Figs. 20 and 22 that when the mechanism is being wound up as already described that it is necessary for the arms 163 and 164 to pass over the rollers 123 on the contact blocks A and C and as a result the contacts on said blocks will be temporarily closed but since it is required that a circuit traced through the contacts on the block A shall also be connected in series through the contacts on the block B and since at the time the arm 163 passed over the roller 123, as stated, the contacts on the block B were still open, it can readily be seen that no current would flow through the circuit at this time. The above explanation applies also to the contact blocks C and D which are also connected in series. However, when the device is being run down it will also be noted that the contacts on the blocks B and D are closed so that when the arms 163 and 164 pass over the rollers 123 on the blocks A and C any circuit which is traced through said blocks will be temporarily closed.

A device with intermediate contacts as just described might be used to control an electric lock on the lever of an interlocking machine thus allowing the leverman to operate his lever only during the time the circuit through the intermediate contacts is closed or it may obviously be seen that such a device may be used in many other cases where an intermediate circuit is required. A marker 68ᵃ is preferably placed on the dial, as shown in Fig. 17, to indicate to the operator the period through which the intermediate contacts are closed. It may also be seen by referring to Fig. 20 that the arm 167 may be readily adjusted about the shaft 76 and by so doing the time of closing the intermediate contacts will be changed. The marker may also be changed to any desired place on the dial.

Figure 27:
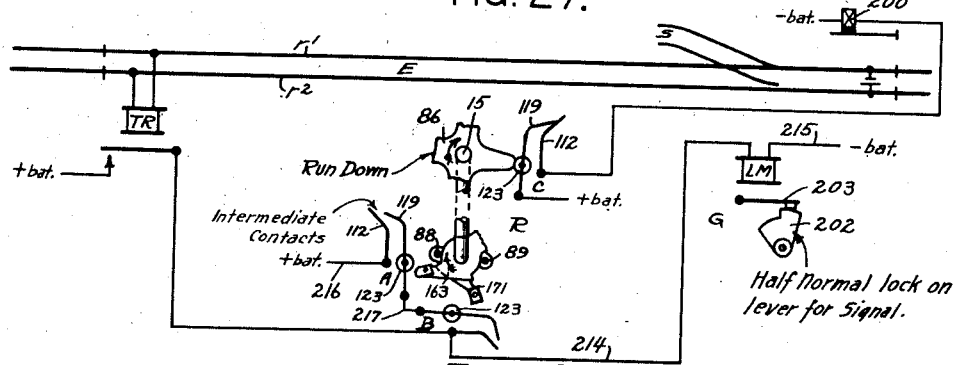
Fig. 27 is a view similar to Fig. 25 showing a modified form of the time release mechanism equipped with an intermediate contact arrangement.

The diagram shown in Fig. 27, illustrates one of the uses to which a time release device equipped with intermediate contact control, may be applied. The device is shown herein, applied to an electric interlocking system and the arrangement and operation of the various devices shown in the diagram are, in general, the same as those shown in Fig. 26. In view of the description of the functions and operation of these devices, already given, it is thought that a further brief description of the added features will be sufficient for a clear understanding of the application and operation of said intermediate contact control.

The time release device as shown in the above figure is in its normal run down position. The signal control circuit as before is taken through a pair of normally closed contact fingers on the circuit controlling unit C of said device. Said fingers are closed in the run down position of said device by an arm on the contact operating member 86 and are biased to open when said device is wound up.

Another contact operating member which is operatively connected to the shaft 15 and operated in a manner fully described hereinbefore, is arranged in operative relation with two other circuit controlling units A and B. The contact fingers on each of said units are biased to an open position when the device is in its run down position. The contact fingers on the unit B are adapted to be closed in the wound up position of said device by an arm on said member and, as before described, remains closed during a predetermined part of the automatic operation of said device from its wound up position toward its run down position; whereas the other pair of contacts on the unit A are closed temporarily at a predetermined point in said automatic operation. The contact fingers on the units A and B are connected in series and when both pairs of said fingers are closed at the same time a circuit is established for energizing the magnet on the electric lock G, for lifting the latch 203 and permitting the signal lever to be operated under certain conditions, as will be later explained.

Assume that the same condition exists which was discussed for the previous diagrams, i. e.: that the operator wishing to change the route which has already been set up for an approaching train, has pulled the signal lever from its reverse position toward its full normal position and has found that said lever is locked against movement to its full normal position. The operator, as before, turns to his time release mechanism and with the present scheme is obliged to wind up and latch the device. By this operation the contact operating member 86 and both arms 163 and 171 of the intermediate control are rotated in a clock-wise direction. It will, therefore, be seen that when the device is fully wound up and latched that the arm on the member 86 has moved out of engagement with the contact fingers on the circuit controlling unit C, thereby permitting said contact fingers to open in response to their bias and further that the arm 171 has engaged and closed the contact fingers on the circuit controlling unit B. It will also be seen that the arm 163 has passed over the roller 123 on the circuit controlling unit A and in so doing temporarily closed said contact fingers, without completing the circuit for the lock G for the reason that the contact fingers on the unit B had not been closed at that time.

The operator next releases the latch and allows the device to run down automatically in a counterclockwise direction, as previously described. As the arm 163 passes over the roller 123 on the unit A during this automatic movement, the contacts 119 and 112 on said unit are again closed temporarily and this time, since the contact arm 171 still engages the roller 123 of the unit B, the contacts on said unit B are closed and a circuit, therefore, is established which will energize the magnet LM of the electric lock G and as a result, the latch 203 is lifted. This circuit may be traced as follows: from positive battery through wire 216, contact fingers 112 and 119 of the unit A, wire 217, contact fingers 119 and 112 of the unit B, wire 214, locking magnet LM of the device G and wire 215 to negative battery.

As soon as the arm 163 passes out of engagement with the roller 123 of the unit A the circuit just traced will be again interrupted and unless the operator has pulled his lever to full normal position during the time that the latch was lifted, said latch will drop and again prevent said movement.

With a device of the above character, the use of a stick relay is eliminated and the operator is given a reasonable length of time to go back and pull his lever to its full normal position before the controlling circuit for the lock G is broken. The operator is, therefore, compelled to be watchful and to operate his lever at the proper time in order to save himself the extra work of repeating the timing operation.

Figure 23:
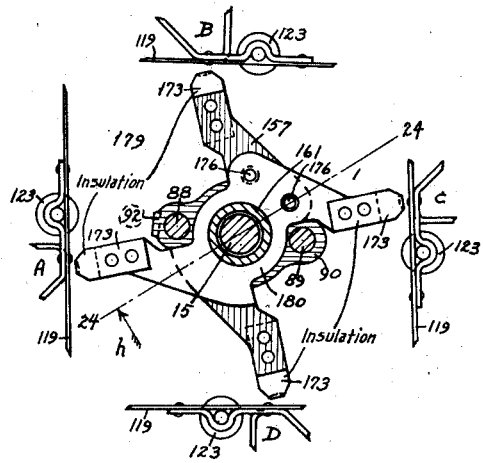
Fig. 23 is a fragmentary view taken substantially as Fig. 3 except that a second modified form of the operating unit is shown.
Figure 24:
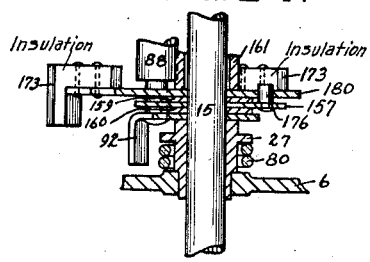
Fig. 24 is a vertical section taken substantially on the line 24—24 in Fig. 23 looking in the direction indicated by the arrow $h$.

When it is desired to close a circuit or group of circuits in the wound up position and to hold said circuits closed after the release has been made and until the device is almost run down, an arrangement of contact operating arms as shown in Fig. 23, is used and is known as the "longholding reverse attachment."

The above attachment is represented on the drawings, as a whole, by the numeral 179 and the construction of parts and the location of said parts is in general the same as just described for the intermediate contact attachment except that in this case the arm 167 on the shaft 76 is omitted as is also the member 158. The member 157 is located on the shaft exactly as before and as shown in Fig. 20 but instead of using the member 158, another member 180 is used which is identical with the member 157 and is simply inverted on the main shaft 15 in respect to the member 157, as shown in Fig. 23. The pin 176 on the member 157 fits into a hole in the member 180 while the pin 176 on the member 180 fits into a corresponding hole in the member 157 as shown in Fig. 23. It will therefore be seen that the two members 157 and 180 although separated by the washer 159 are held locked together by the pins 176 and by referring to Fig. 23 it will be seen that their arms are in operative relation with the rollers 123 on the contact blocks A, B, C and D.

The operation of the attachment just described is the same as that of the member 157 of the intermediate contacts, that is, when the mechanism is wound up as previously described, the lower end of the studs 88 and 89 will engage the members 157 and 180 and will rotate them about their center in a clockwise direction. The insulating portions on each of the members 157 and 180 will engage the rollers 123 on the contact blocks A, B, C and D and will cause the contacts on said blocks to be closed as hereinbefore described. The members 157 and 180 when once fully on said rollers 123 will be locked in said position in a manner which has been fully set forth in the preceding description and will remain in said locked position, with the contacts on said contact blocks held closed, until the device has been released and has run down far enough to allow the studs 88 and 89 to again engage the members 157 and 180 and to force said members out of their locked position. It will therefore be apparent that circuits traced through said contact blocks A, B, C and D will be closed when the device is completely wound up and will be held closed until the device is almost run down and has consumed a predetermined amount of time.

Figure 28:
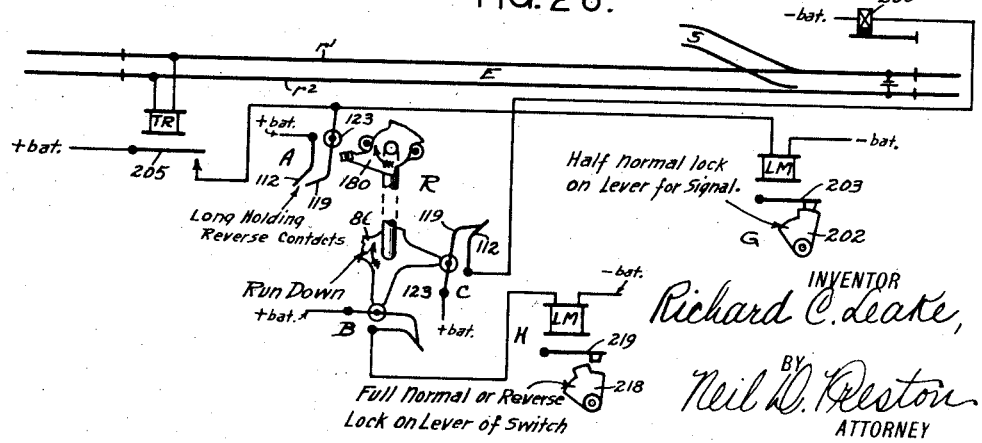
Fig. 28 is a view similar to Fig. 27 showing another modified form of the time release equipped with a long holding reverse contact arrangement.

Fig. 28 illustrates, diagrammatically, a time release mechanism equipped with a long holding reverse contact, applied to an electric interlocking system for the control of electric locks on both the signal lever and the switch lever of an interlocking machine. The arrangement of the various devices, shown in Fig. 28, is in general the same as that in the preceding diagrams and their operation will be well understood by those skilled in the art.

The control circuit for the signal is taken, as before, through a pair of contact fingers on the time release device, which are closed in the normal run down position of said device and biased to open when said device is wound up. The control for the electric lock G, on the signal lever, is also taken, as before, through a pair of contact fingers on the time interval device, which are biased to open in the normal run down position of said device. These last mentioned fingers are closed by an arm on the long holding reverse operating member 180 when the device is in its wound up and latched position and owing to the peculiar construction of said member, which has been fully described hereinbefore, the contact fingers will be held closed after said device has been unlatched and until the operating unit has moved through a predetermined number of degrees of angular movement.

An additional electric lock H is provided in this scheme which is similar to the lock G and is operatively connected to the switch lever in a like manner. Said lock H is adapted to lock said lever, under certain conditions, against movement in either its normal or reverse position, as will be later explained. This lock is controlled through a pair of contact fingers, on the time release device, which are closed in the normal run down position of said device and biased to open when said device is wound up.

Assuming that the operator, as in the preceding discussions, had set up a route over the main track for an approaching train and had later decided to change said route to one over the switch S, the signal lever being at this time reversed, he now pulls it back toward its full normal position and finds, as before, that the lever is locked against movement to said full normal position. It now becomes necessary, as in the other schemes, to use the time release mechanism. This device being normally run down, he is obliged to wind it up and latch it in its wound up position.

As soon as the winding operation starts the contact fingers on the circuit controlling unit C are opened, thereby interrupting the signal control circuit and also the control circuit for the lock H causing its magnet to become deënergized and its latch 219 to drop. The dropping of latch 219 locks the switch lever in its normal position. When the device reaches its wound up and latched position, an arm on the member 180 closes the contact fingers on the circuit controlling unit A, as above stated, and establishes a pick up circuit for the lock G, thereby lifting the latch 203 and freeing the signal lever so that it can be pulled to its full normal position.

The operator next releases the latch on the time release mechanism and permits said mechanism to return automatically to its normal run down position, thereby consuming the predetermined length of time for which the device has been adjusted. The arm on the member 180, however, will hold the contact fingers, on the unit A, closed for a predetermined part of the automatic movement of the mechanism to its run down position, thereby allowing plently of time for the operator to pull his signal lever to its full normal position before the control circuit for the signal lever lock G is interrupted and the control circuit for the switch lever lock H is again established.

From the foregoing description of the operation it will be obvious, that, although the signal lever is in its full normal position, thereby releasing the mechanical locking of the switch lever, the additional lock H on said switch lever prevents the operator from changing the position of the switch lever to operate the switch S until a certain predetermined time interval has elapsed.

It will be noted that in Figs. 26, 27 and 28 of the above diagram the control circuit for the signal has been taken through contacts on the time release device which are closed only in the normal position of said device. The reason for this is that in signaling practice it must positively be assured that the signal is in its danger position before the switch lever is operated.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a clockwork time release, in combination: circuit controlling means comprising a movable element and a plurality of contacts adapted to be changed so as to be either opened or closed in either of two extreme positions of the movable element, means for automatically operating said circuit controlling means; a timing mechanism for limiting the speed of said automatic operation; and means for rendering said timing mechanism ineffective after said movable element has made a predetermined portion of its entire movement from one extreme position to the other.

2. In a clockwork time release, in combination: circuit controlling means comprising a plurality of contacts each adapted to be changed so as to be either opened or closed in the respective circuit controlling conditions of said means; means for automatically operating said circuit controlling means; a timing mechanism adapted to be adjusted within itself, for regulating the speed of said automatic operation; and adjustable means for rendering said timing mechanism ineffective at any desired point in the automatic operation of said circuit controlling means.

3. In a clockwork time release, in combination: circuit controlling means comprising a plurality of contacts each adapted to be changed so as to be either opened or closed in the respective circuit controlling conditions of said means; means for automatically operating said circuit controlling means; a timing mechanism including an escapement wheel and an escapement pallet for regulating the speed of said automatic operation; and adjustable means for moving said pallet out of engagement with said escapement wheel after a selected predetermnied length of time has been consumed.

4. A clockwork time release having two extreme circuit controlling positions and including a plurality of contacts each adapted to be changed so as to be automatically closed in either extreme position, each contact closing in an extreme position by said circuit controlling means being automatically opened when that means is moved from that position, means for automatically operating said circuit controlling means from one extreme position to the other, and timing mechanism for regulating the rate of said automatic movement.

5. A clockwork time release comprising a plurality of individual circuit controllers and operating means therefor having two extreme positions, each of said individual circuit controllers being adapted to be changed about so as to be either opened or closed in the same extreme position of said operating means.

6. A clockwork time release comprising a plurality of individual circuit controllers, a movable element having two extreme positions for operating said circuit controllers, each of said circuit controllers being adapted to be reversed so as to be closed in either extreme position of said element, a spring for automatically moving said element from its wound up extreme position to its run down position, timing mechanism effective during the run down movement of said element, and adjustable means for rendering said timing mechanism ineffective after a selected portion of the run down movement of the element has occurred, whereby the interval of time required for the element to change from its wound up to the run down position may be varied without modifying the extent of its movement.

7. In a clockwork time release, in combination: circuit controlling means comprising a plurality of contacts each adapted to be changed so as to be either opened or closed in the respective circuit controlling conditions of said means; means for automatically operating said circuit controlling means; a train of gears driven by said last mentioned means said train of gears including an escapement wheel; an escapement pallet adapted to coöperate with said escapement wheel to limit the speed of said automatic operation; an adjustable support for said pallet; and a cam plate adjustably secured to one of the gears in said gear train for coöperating with said adjustable support to move said pallet out of engagement with said escapement wheel at any desired point in the automatic operation of said circuit controlling means.

8. In a clockwork time release, in combination: circuit controlling means comprising a plurality of contacts each adapted to be changed so as to be either opened or closed in the respective circuit controlling conditions of said means; means for automatically operating said circuit controlling means; and means for regulating the length of time required for said automatic operation.

9. In a clockwork time release, in combination: a clockwork mechanism comprising a shaft and an escapement wheel, said escapement wheel being loosely mounted on said shaft and connected to rotate therewith; means for automatically operating said mechanism; an escapement pallet adapted to coöperate with said escapement wheel to limit the speed of said automatic operation; and means operated by said mechanism for moving said pallet out of engagement with said escapement wheel at any desired point in the automatic operation of said mechanism.

10. In a clockwork time release, in combination: a clockwork mechanism comprising an escapement wheel; means for automatically operating said mechanism; an escapement pallet adapted to coöperate with said escapement wheel to limit the speed of said mechanism; a movable support for said pallet, means operated by said mechanism and including an adjustable cam for operating said support to move said pallet out of engagement with said escapement wheel, and stops for engaging said pallet, upon being moved out of engagement with said wheel, to cause it to assume an alinement assuring a positive clearness between the teeth of said pallet and those of said wheel.

11. A circuit controlling device, in combination: a contact operating member having two operating arms, said member being rotatably mounted and having two extreme positions, the angle of movement of said member from one of said positions to the other being less than the angle included between said arms; a stationary circuit controlling means adapted to be engaged by one of said arms in one position and to be adjusted to be engaged by the other of said arms in the other position.

12. A circuit controlling device, in combination: a contact operating member having a plurality of contact operating arms, said member being rotatably mounted and having two extreme positions, the angle of movement of said member from one extreme position to the other being less than the included angle between said operating arms; individual stationary circuit controllers associated with each of said arms, comprising a member adapted to engage its adjacent operating arm in one of said positions, said circuit controlling devices being adapted to be adjusted to make the angle included between the members on any two adjacent circuit controlling devices either equal to, or greater or less than the included angle between said operating arms.

13. In a circuit controlling device, in combination: a contact operating member having two operating arms, said member being rotatably mounted and having two extreme positions, the angular degree of movement from one of said positions to the other being less than the included angle between said operating arms; and a stationary circuit controlling device arranged in coöperative relation with said operating arms, comprising an insulating block, a contact arm fixed to said block, a contact spring resiliently supported on said block adapted to coact with said contact arm, a member carried by said contact spring and located at one side of the center thereof adapted to engage one of said operating arms in one of said positions to cause said contact arm and said contact spring to coact, said member also being adapted to be adjusted to coact with the other of said operating arms in the other of said positions, a retainer carried by said contact spring adapted to coact with the support for said contact spring for limiting the outward movement of said contact spring, a binding post for said contact arm and one for said contact spring, said posts being adapted to secure their respective members to said insulating block.

14. In a clockwork time release mechanism, in combination: a main driving member rotatably mounted and having two operated positions; a shaft associated with said member and biased to one of said operated positions, said shaft having a locking dog secured thereto; a contact operating unit, loosely mounted on said shaft, comprising a secondary driving member adapted to be driven by said main driving member and to in turn drive said locking dog and said shaft as said main driver is rotated from one of said positions to the other; a spring coöperating with said unit during a part of its movement to cause said unit to be spring-pressed in said other operated position; a latch adapted to engage said locking dog and said secondary driving member to hold said shaft and said unit in said other position; and circuit controlling means adapted to coöperate with said operating unit in either of said positions.

15. In a clockwork time release, in combination: a circuit controlling device having a wound-up position and a run down position; manually operable means for operating said device to said wound-up position; latching means for holding said device in said wound-up position; means included in said first mentioned means for rendering said latching means ineffective; means for automatically returning said device to its run down position; timing mechanism for limiting the speed of said automatic operation; and means for rendering said timing mechanism ineffective at any desired point in its operation.

16. In a clockwork time release, in combination: circuit controlling means adapted to be wound-up from one circuit controlling position to another of said positions; means actuated by said winding operation for automatically returning said circuit controlling means to its initial position; timing mechanism operated by said automatic operation for causing said circuit controlling means to consume a predetermined length of time in traveling continuously from its wound-up position to its run down position; and adjustably automatic means for rendering said timing mechanism ineffective at any predetermined point in the continuous travel of said circuit controlling means from its wound-up to its run down position.

17. In a clockwork time release, in combination: circuit controlling means adapted to be wound-up from one circuit controlling position to another of said positions; means actuated by said winding operation for automatically returning said circuit controlling means to its initial position; other circuit controlling means coöperating with said first mentioned circuit controlling means for temporarily controlling a circuit at an intermediate point in the travel of said first mentioned means from its wound-up position to its initial position; timing mechanism for limiting the speed of said automatic operation to assure that a predetermined length of time will be consumed in said operation; and means for rendering said timing mechanism ineffective at any desired point in said automatic operation.

18. In a clockwork time release, in combination: circuit controlling means adapted to be wound-up from one circuit controlling position to another; means actuated by said winding for automatically returning said circuit controlling means to its initial position; timing mechanism, operated by said means for automatically returning said circuit controlling means, for causing a predetermined length of time to be consumed for said automatic operation; means for rendering said timing mechanism ineffective after the lapse of said predetermined length of time; and other circuit controlling means associated with said first mentioned circuit controlling means and operated thereby for controlling a circuit in said wound-up position and for maintaining said control until said predetermined length of time has been consumed by said first circuit controlling means.

19. In a clockwork time release, in combination: a timing device adapted to be operated automatically, including an escapement wheel and an escapement pallet adapted to coöperate to limit the speed at which said device operates; means for adjusting said pallet in relation to said escapement wheel to vary the distance between the center of said wheel and the center of said pallet and thereby vary the speed at which said timing device operates; means operated by said timing device for moving said pallet out of engagement with said escapement wheel at any desired point in the operation of said device; and circuit controlling means governed by said timing device.

20. In a clockwork time release, in combination: circuit controlling means adapted to be wound-up to a circuit controlling position; means actuated by said winding operation for automatically returning said circuit controlling means to its initial position; timing mechanism operated by said last mentioned means for causing a predetermined length of time to be consumed for said automatic operation; means for rendering said timing mechanism ineffective at any point of said automatic operation; and means governed by said last mentioned means for indicating, in said wound-up position, the time to be consumed by said automatic operation, and thereafter, each successive degree of time consumed during said automatic operation.

21. In a circuit controlling device, in combination: a plurality of sets of individual circuit controlling units, each comprising a pair of normally biased coöperating contacts; means for operating said units, said means being adapted to be wound-up from one circuit controlling position to another each of said units being adapted to be changed so as to be either opened or closed in either extreme position of said operating means; means for latching said operating means in its wound up condition; means adapted for rendering said latching means ineffective; means actuated by said winding operation and effective when said latching means is rendered ineffective, for automatically returning said operating means to its initial position, and other means actuated by said winding operation and effective when said latch is rendered ineffective for causing said operating means to be released with a quick movement.

22. In a circuit controlling device, in combination: circuit controlling means adapted to be wound-up from one circuit controlling position to another; latching means adapted to hold said circuit controlling means in its wound-up condition; means adapted to release said latching means; means actuated by said winding operation and effective when said latching means is released, for automatically returning said circuit controlling means to its initial position, and other means actuated by said winding operation and effective when said latching means is released for causing said circuit controlling means to start its automatic operation with a quick movement.

23. In a clockwork time release, in combination: circuit controlling means adapted to be wound up from one circuit controlling position to another of said positions; means actuated by said winding operation for automatically returning said circuit controlling means to its initial position; timing mechanism for limiting the speed of said automatic operation; adjustable means for rendering said timing mechanism ineffective at any desired point in said automatic operation, and other circuit controlling means, coöperating with said first mentioned circuit controlling means and governed by said timing mechanism and said last mentioned adjustable means, for temporarily controlling a circuit at an intermediate point in the travel of said first mentioned circuit controlling means from its wound up position to its initial position.

24. A clockwork time release comprising circuit controlling means including a movable member having a wound up position and a run down position and provided with a plurality of contact pairs each adjustable to be either opened or closed in the corresponding position of said member, and time controlled mechanism for operating said member, whereby various combinations of circuits may be opened or closed in the wound up or run down position of the device.

25. In a clockwork time release, in combination: circuit controlling means including an element having a fixed range of movement from one position to another; timing mechanism for controlling the rate of movement of said element in one direction and adjustable means controlled by said element for rendering said timing mechanism ineffective at any desired point in the range of movement of said element.

26. A clockwork time release, in combination with a shaft adapted to be automatically rotated in one direction through an angle of a predetermined number of degrees; timing mechanism for governing the speed of rotation of said shaft; adjustable means governed by the rotation of said shaft for rendering said timing mechanism ineffective when said shaft has been rotated through any desired number of degrees of said angle; and indicating means governed by said adjustable means for indicating in units of time the number of degrees through which the rotation of said shaft is governed by said timing mechanism.

27. A clockwork time release, in combination: a shaft adapted to be automatically rotated in one direction through an angle of a predetermined number of degrees; timing mechanism for governing the speed of rotation of said shaft; adjustable means governed by the rotation of said shaft for rendering said timing mechanism ineffective when said shaft has been rotated through any desired number of degrees of said angle; a dial having graduations in units of time; a pointer adapted to be rotated about said shaft as a center and to coöperate with said dial; and means governed by said adjustable means for causing said pointer to be rotated about said shaft as a center and to register on said dial in units of time the number of degrees through which the rotation of said shaft is governed by said timing mechanism.

28. A clockwork time release comprising an oscillatory contact operating member having a plurality of operating arms and movable between two extreme positions, a plurality of individual circuit controllers arranged around the axis of oscillation of said operating member in coöperative relation with said operating arms, each of said circuit controllers being adapted to be changed so as to be engaged by an operating arm in either extreme position of the operating member.

29. A clockwork time release comprising an oscillatory operating member having a number of arms arranged in groups and moving in different planes, said operating member being movable between two extreme positions, a plurality of circuit controllers arranged in tiers around the axis of oscillation of the operating member in coöperative relation with the operating arms, and timing mechanism for regulating the movement of the operating member in one direction.

30. A clockwork time release comprising a supporting frame, a main shaft journaled in the frame and movable between two extreme positions, a contact operating member driven by the shaft and having a plurality of operating arms extending radially from the shaft at equal angles, a plurality of circuit controlling units supported by the shaft in coöperative relation with said operating arms, each of said means being adapted to be detached and changed so as to be engaged by an operating arm in one or the other extreme positions of the shaft.

31. A clockwork time release comprising a shaft having a wound up and run down position, means for returning the shaft to its run down position, timing mechanism for regulating the return movement of the shaft, a contact operating member loosely mounted on the shaft, means constituting a lost motion connection between the shaft and and said operating member, a plurality of contacts operated by the operating member, a spring placed under tension when the operating member assumes its wound up position, and a handle acting on the operating member for winding up the release, whereby when the release is wound up and the handle is released the operating member is given a short, quick movement by the action of the spring by virtue of the lost motion connection so as to snap open the contacts which are closed in the wound up position of the release.

32. In a clockwork time release having a wound up position and a run down position of its parts, a shaft, means for moving the shaft from the wound up position to the run down position, a contact operating member loosely mounted on the shaft, a lost motion connection between the operating member and the shaft, a plurality of contacts operated by the operating member, a spring placed under tension when the operating member assumes its wound up position, a handle acting on the operating member to wind up the release, timing mechanism for regulating the rate of return movement of the shaft, and means controlled by the movement of the shaft for rendering said timing mechanism ineffective at any desired point in its return movement, whereby a quick operation of the contacts is obtained in both the wound up and run down positions of the release.

33. In a clockwork time release comprising a supporting frame, a vertical shaft journaled in said frame having a wound up and run down position, a spring for returning the shaft to its run down position, adjustable timing mechanism for regulating the return movement to its run down position, a contact operating member actuated by the shaft and having a plurality of equally spaced arms extending radially from the shaft, an equal number of circuit controller units arranged about the shaft and each having an actuating part capable of being engaged by a operating arm, said circuit controller units being detachably secured to the frame and being capable of being changed so as to have its actuating part engaged by an operating arm in either the wound up or run down position of the shaft.

34. In a clockwork time release comprising a base, a spring motor and timing mechanism supported on the base, a vertical shaft extending upward from the motor, circuit controlling means including an operating element actuated by the shaft, a plurality of circuit controllers arranged around the shaft, each adapted to be reversed so as to be either opened or closed in the corresponding position of said operating element, and indicating means disposed at the top of the instrument above the circuit controlling means, said indicating means comprising a dial and a pointer controlled by the timing mechanism.

35. In a clockwork time release comprising a movable element operable manually to a wound up position and being automatically returned to its run down position through a fixed range of movement, timing mechanism for regulating the speed of the run down movement of said element, adjustable means governed by said element for throwing said timing mechanism out of operation at any selected point in the run down movement of the element, thereby permitting the time interval required for said run down movement to be adjusted, a plurality of circuit controllers arranged to operate the said movable element and adapted to be changed so as to be closed in either the wound up or run down position of the movable element.

36. In a clockwork time release comprising a movable element having a wound up and run down position, a plurality of circuit controllers biased to open and adapted to be changed so as to be closed in either the wound up or run down position of said element, timing mechanism for regulating the time of the return movement of said element to its run down position, latching mechanism for retaining said element in its wound up position, and a manually operable member adapted when moved in one direction to drive the element to its wound up position and when moved in the other direction to automatically release the latching mechanism.

37. In a clockwork time release having a wound up and run down position and including a circuit controlling means and a timing mechanism, said circuit controlling means comprising a plurality of contacts each adapted to be changed so as to be operated to the closed position in either the wound up or the run down position of the release.

38. In a clockwork time release comprising a movable element manually operable to a wound up position and automatically returned to its run down position, an adjustable timing mechanism for regulating the automatic return movement of said element, a plurality of circuit controllers arranged to coöperate with said movable element, said circuit controllers being adapted to be changed to permit any selected number of the plurality to be closed in the wound up position and those not selected to be closed in the run down position, each circuit controller closed in either position being automatically opened when the element is moved from that position.

39. In a clockwork time release comprising a movable element having a number of operating arms, said element being manually operable to a wound up position and being automatically returned to a run down position through a fixed range of movement, a timing mechanism governed by said element and adjustable to vary the time of its run down movement, and a plurality of circuit controllers arranged to be operated by the operating arms of said element, each circuit controller being biased to open and being adapted to be changed so as to be closed in either the wound up or run down position of the element.

40. A clockwork time release of the type which has a wound up position and a run down position, which requires a predetermined interval of time to return to its run down position, and which is capable of operating a plurality of circuit controllers, the combination with the operating element of said release, of latching mechanism adapted to retain said element in its wound up position, a manually movable catch for holding the latching mechanism inactive, a handle for winding up the release when moved in one direction, and means associated with the handle and operated by its movement in the opposite direction for releasing the latching mechanism when it is active.

41. In a clockwork time release comprising a movable element having a wound up and run down position, a plurality of circuit controllers coöperating with said element, latching mechanism for retaining said element in its wound up position, a handle adapted when moved in one direction to operate the element to its wound up position, means associated with the handle for releasing the latching mechanism when the handle is moved in the opposite direction, timing mechanism for regulating the rate of the return movement of the element, and adjustable means governed by the movement of the element for rendering said timing mechanism ineffective at any selected point in its return movement.

42. A clockwork time release comprising a frame, a main shaft journaled in said frame, a contact operating member operatively connected to said shaft and having a plurality of operating arms, a plurality of individual circuit controlling units supported by said frame around said shaft as a center and in coöperative relation with the arms of said member, manually operable means for rotating said shaft and said member in one direction from the run down position to the wound up position, means for latching said member in the wound up position, means operable manually for releasing said latching means, a spring for returning said shaft and said member automatically to the run-down position and timing mechanism for regulating the speed of such return movement, said mechanism being adjustable to time said return movement up to any selected point.

43. A clockwork time release comprising an oscillatory contact operating member having two operating arms and two extreme positions, the angle of movement from one of said positions to the other being less than the included angle between said operating arms, a stationary circuit controlling unit comprising a movable contact, an actuating member carried thereby, said unit being adapted to be changed to cause its actuating member to be located in position to be engaged by one or the other of said operating arms, whereby said unit may be changed so as to be operated in either extreme position of the operating member.

44. In a clockwork time release, a clockwork mechanism comprising a shaft, an escapement wheel having a hub secured to said shaft, the diameter of the bore of said hub being greater than the diameter of said shaft, thereby permitting said wheel when rotating at high speeds to aline itself on said shaft and thus prevent excessive vibration, an escapement pallet adapted to coöperate with the escapement wheel, and means for moving said pallet out of engagement with said escapement wheel at times.

45. In a clockwork time release, the combination with an operating member having two spaced arms, of a reversible circuit controller unit comprising a supporting block of insulating material adapted to be supported at its ends either end to, stationary movable contact members separately secured to said block by binding posts and resiliently urged apart, and a roller carried by the movable contact member and arranged to be engaged by one or the other of the arms of said operating member depending upon the adjustment of said block.

46. In a clockwork time release, the combination with a rotatable operating member having two arms and movable through an angle less than the angle between said arms, a reversible circuit controlling unit comprising an insulating block adapted to be supported at its ends, a contact spring supported by said block at one end, a strip of metal attached to the contact spring and having one end portion slit into three strips, the middle strip being bent to form a hook adapted to limit the outward movement of said spring, the remaining pair of strips being formed into a bearing, and a roller journaled in said bearing and projecting through an opening in said contact spring, said roller being engaged by the arms of said operating member.

47. A clockwork time release, comprising a contact operating member having two operating arms, said member being rotatably mounted and movable between two extreme positions through an angle less than that between said operating arms, and stationary circuit controlling means adapted to be engaged by one of said arms in one position and to be adjusted to be engaged by the other arm in the other position.

RICHARD C. LEAKE.